(12) United States Patent
Moriyama et al.

(10) Patent No.: US 8,477,404 B2
(45) Date of Patent: Jul. 2, 2013

(54) DISPLAY MEDIUM AND DISPLAY DEVICE

(75) Inventors: Hiroaki Moriyama, Kanagawa (JP);
Yoshinori Machida, Kanagawa (JP);
Yasuo Yamamoto, Kanagawa (JP);
Ryojiro Akashi, Kanagawa (JP); Akira Imai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1095 days.

(21) Appl. No.: 12/398,832

(22) Filed: Mar. 5, 2009

(65) Prior Publication Data

US 2010/0073281 A1 Mar. 25, 2010

(30) Foreign Application Priority Data

Sep. 25, 2008 (JP) ................................. 2008-246211

(51) Int. Cl.
*G02B 26/00* (2006.01)

(52) U.S. Cl.
USPC ........................................................ 359/296

(58) Field of Classification Search
USPC ..................... 359/296; 252/582, 586; 430/32, 430/34, 38; 204/450, 600; 345/107, 105
See application file for complete search history.

(56) References Cited

U.S. PATENT DOCUMENTS

| | | | |
|---|---|---|---|
| 5,622,804 A | 4/1997 | Matsuoka et al. | |
| 5,723,250 A | 3/1998 | Matsuoka et al. | |
| 5,863,684 A | 1/1999 | Suzuki et al. | |
| 7,004,592 B2 * | 2/2006 | Varaprasad et al. | 359/603 |
| 7,079,305 B2 * | 7/2006 | Paolini et al. | 359/296 |
| 7,224,510 B2 * | 5/2007 | Kitano et al. | 359/296 |
| 7,319,554 B1 | 1/2008 | Abe et al. | |
| 7,463,409 B2 * | 12/2008 | Daniel et al. | 359/296 |
| 7,485,368 B2 | 2/2009 | Minami | |
| 7,682,651 B2 * | 3/2010 | Martins et al. | 427/58 |
| 2002/0089495 A1 | 7/2002 | Matsuura et al. | |
| 2003/0086149 A1 | 5/2003 | Kawai | |
| 2006/0263927 A1 | 11/2006 | Sakurai et al. | |
| 2008/0174854 A1 | 7/2008 | Sakurai et al. | |

FOREIGN PATENT DOCUMENTS

| | | |
|---|---|---|
| JP | A-7-325434 | 12/1995 |
| JP | B2-2729299 | 12/1997 |
| JP | A-10-3177 | 1/1998 |
| JP | A-2003-131420 | 5/2003 |
| JP | A-2003-140202 | 5/2003 |
| JP | A-2003-202604 | 7/2003 |
| JP | A-2004-279647 | 10/2004 |
| JP | A-2005-128501 | 5/2005 |
| JP | A-2005-275215 | 10/2005 |

(Continued)

OTHER PUBLICATIONS

Japanese Office Action issued in Japanese Application No. 2008-246211 on Dec. 7, 2010 (with translation).

*Primary Examiner* — Tuyen Tra
(74) *Attorney, Agent, or Firm* — Oliff & Berridge, PLC

(57) ABSTRACT

A display medium includes: a pair of substrates having electrodes and disposed to form a space therebetween, at least one of the substrates transmitting light; a dispersion medium enclosed between the substrates; a group of particles that is dispersed in the dispersion medium and that moves in the dispersion medium according to an electric field applied between the substrates; and a treatment layer provided on at least one of surfaces of the substrates that oppose each other, the treatment layer being formed by treating the at least one of surfaces of the substrates that oppose each other with a polymer compound having a silicone chain.

18 Claims, 11 Drawing Sheets

FOREIGN PATENT DOCUMENTS

| | | |
|---|---|---|
| JP | A-2005-345568 | 12/2005 |
| JP | B2-4035550 | 11/2007 |
| JP | A-2008-58394 | 3/2008 |
| WO | WO 2004/077140 A1 | 9/2004 |
| WO | WO 2004/079441 A1 | 9/2004 |

* cited by examiner

DISPLAY MEDIUM AND DISPLAY DEVICE

CROSS-REFERENCE TO RELATED APPLICATION

This application is based on and claims priority under 35 USC 119 from Japanese patent Application No. 2008-246211 filed on Sep. 25, 2008.

BACKGROUND

1. Technical Field

The present invention relates to a display medium and a display device.

2. Related Art

As a repeatedly-rewritable display medium, a display medium using particles has been known. The display medium has a configuration including, for example, a pair of substrates and a group of particles that is enclosed between the substrates such that the group of the particles is movable between the substrates in accordance with an electric field applied between the pair of substrates. Further in some cases, a spacing member partitioning the space between the substrates into plural cells is placed between the substrates so as to, for example, prevent the particles from localizing in a specific area between the substrates.

The group of particles enclosed between the pair of substrates may include one kind of particles colored in a specific color or plural kinds of particles having different colors and different electric field intensities required for moving.

The display medium allows the enclosed particles to move by applying a voltage between the pair of the substrate, and displays an image having a color corresponding to the color and amount of the particles that have moved to either side of the substrates. Namely, a voltage is applied between the substrates according to the color and density of an image to be displayed, the magnitude of the voltage being able to cause moving of the desired group of particles, so that the desired group of particles moves toward either one of the substrates to display an image having the color and density of the image to be displayed.

SUMMARY

According to an aspect of the present invention, there is provided a display medium including: a pair of substrates having electrodes and disposed to form a space therebetween, at least one of the substrates transmitting light; a dispersion medium enclosed between the substrates; a group of particles that is dispersed in the dispersion medium and that moves in the dispersion medium according to an electric field applied between the substrates; and a treatment layer provided on at least one of surfaces of the substrates that oppose each other, the treatment layer being formed by treating the at least one of surfaces of the substrates that oppose each other with a polymer compound having a silicone chain.

BRIEF DESCRIPTION OF THE DRAWINGS

Exemplary embodiments of the present invention will be described in detail based on the following figures, wherein.

DETAILED DESCRIPTION

Figure 1:
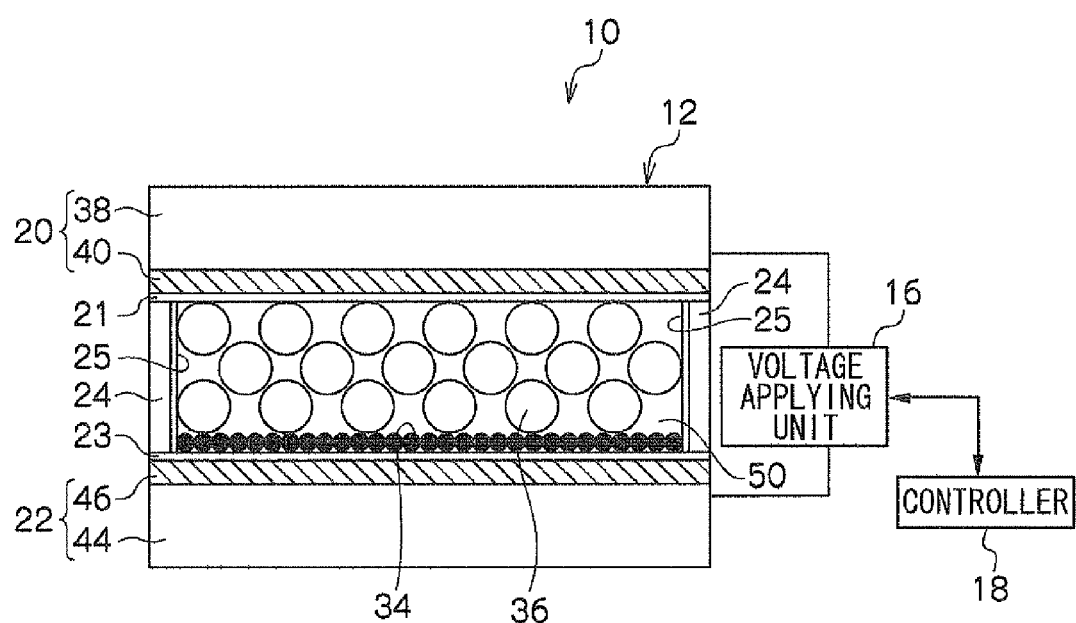
FIG. 1 is a schematic view of a display device according to a first exemplary embodiment of the present invention.

Hereinafter, exemplary embodiments of the present invention will be described with reference to attached drawings. Elements having substantially the same function and action are denoted by the same reference numeral throughout the drawings, and overlapping descriptions therefor are sometimes omitted.

First Exemplary Embodiment

Figure 2A:
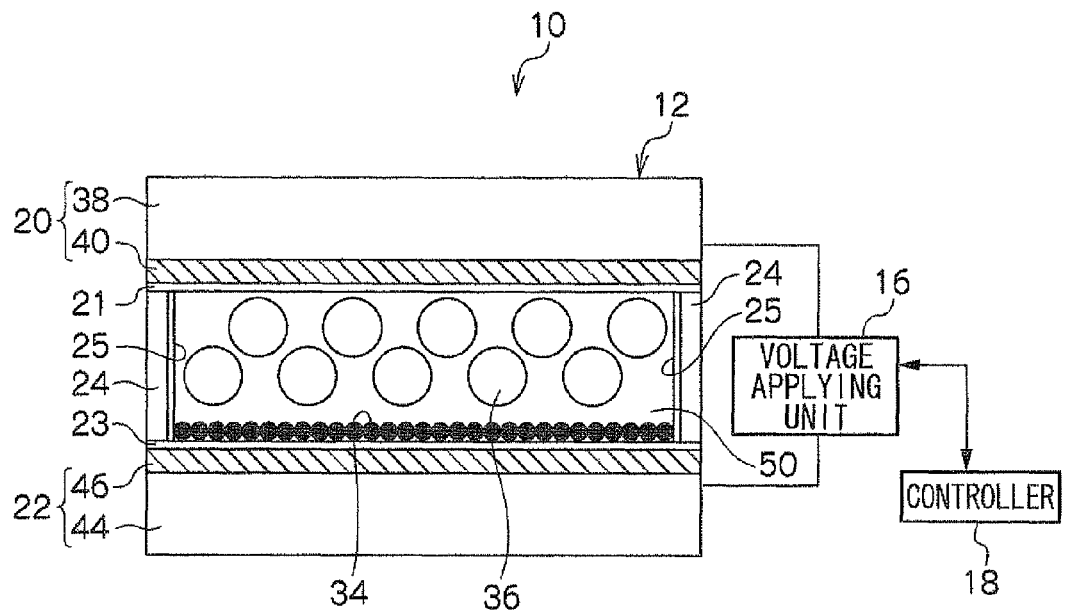
FIGS. 2A and 2B are illustrations schematically showing a moving mode of a group of particles when a voltage is applied between the substrates of a display medium in a display device according to the first exemplary embodiment.
Figure 2B:
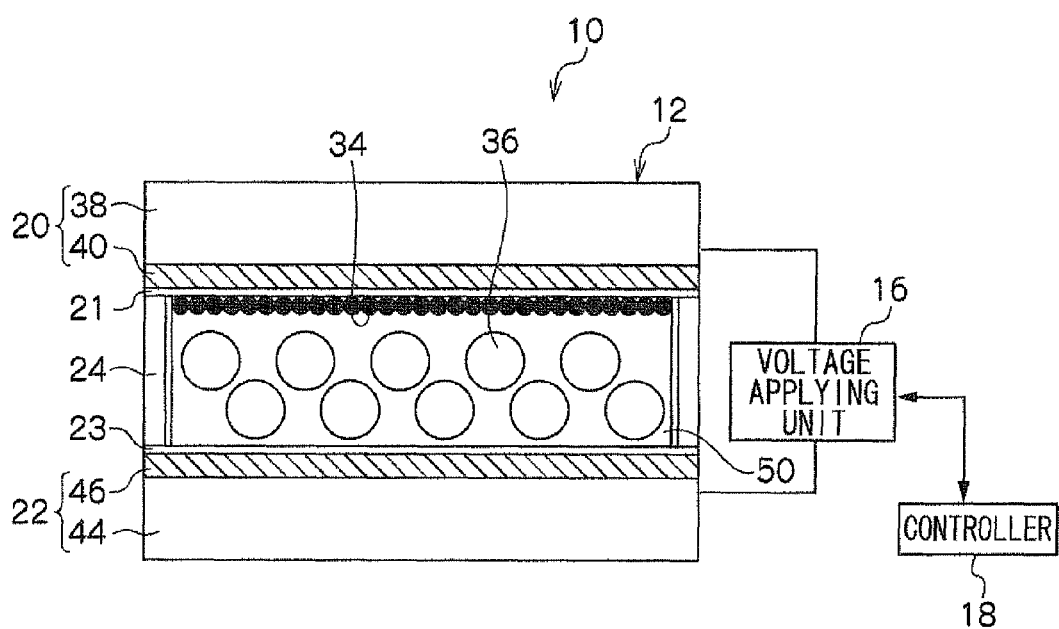

FIG. 1 is a schematic view of a display device according to a first exemplary embodiment of the present invention. FIGS. 2A and 2B are illustrations schematically showing a moving mode of a group of particles when a voltage is applied between the substrates of a display medium in a display device according to the first exemplary embodiment. Elements having substantially the same function and action are designated by the same reference numeral throughout the drawings, and overlapping descriptions therefor are sometimes omitted.

A display device 10 according to the first exemplary embodiment includes, as shown in FIG. 1, a display medium 12, a voltage applying unit 16 that applies a voltage to the display medium 12, and a controller 18.

The display medium 12 contains a display substrate 20 serving as an image display surface, a rear substrate 22 facing the display substrate 20 with a space therebetween, spacing member 24 which holds these substrates to maintain a given spacing therebetween and which divides a space between the display substrate 20 and the rear substrate 22 into plural cells, a group of particles 34 enclosed in each cell, and a group of large-diameter colored particles 36 having optical reflection properties different from those of the group of particles 34.

The cell refers to an area surrounded by the display substrate 20, the rear substrate 22, and the spacing member 24. In this cell, the dispersion medium 50 is enclosed. The group of particles 34 (which will be described later in detail) contain plural particles, is dispersed in the dispersion medium 50, and moves, through gaps among the large-diameter colored particles 36, between the display substrate 20 and the rear substrate 22 according to the strength of the electric field formed in the cell.

In the present exemplary embodiment, the description will be given based on an assumption that the group of particles 34 enclosed in one cell has a predetermined color and has been positively or negatively charged in advance.

The display medium 12 may be configured such that pixel-by-pixel display can be realized by forming cells corresponding to respective pixels (of a displayed image on this display medium 12); the cells corresponding to the respective pixels may be formed by providing the spacing member 24 so as to form the cells.

For simplifying the description, the present exemplary embodiment will be described with reference to figures each illustrating one cell. Hereinafter, the respective elements will be described in detail.

First, a pair of substrates will be described. The display substrate 20 has a structure in which a front electrode 40 is disposed on a supporting substrate 38. The rear substrate 22 has a structure in which a rear electrode 46 is disposed on a supporting substrate 44.

The display substrate 20 has, or both the display substrate 20 and the rear substrate 22 have light-transmitting property. The light-transmitting property in the present exemplary embodiment indicates that the transmittance of visible light is 60% or more.

Examples of the supporting substrate 38 and the supporting substrate 44 include a glass or plastic substrate, such as a substrate of polyethylene terephthalate resin, polycarbonate resin, acrylic resin, polyimide resin, polyester resin, epoxy resin, or polyether sulfone resin.

The material of the front electrode 40 or the rear electrode 46 may be an oxide of indium, tin, cadmium, antimony, or the like, a complex oxide such as ITO, a metal such as gold, silver, copper, or nickel, or an organic material such as polypyrrole or polythiophene. These substances may be used to form a single-layer film, a mixed film, or a composite film. The front electrode 40 and the rear electrode 46 each may be formed by, for example, vacuum deposition, sputtering, or coating. The thickness of each electrode is generally from 100 Å to 2,000 Å when vacuum deposition or sputtering is used. The rear electrode 46 and/or the front electrode 40 may be formed into a desired pattern, such as a matrix or a stripe (with which passive matrix driving is possible), by a conventional measure such as etching of a conventional liquid-crystal-display medium or a conventional printed board.

The front electrode 40 may be embedded in the supporting substrate 38. The rear electrode 46 may be embedded in the supporting substrate 44. In this case, materials of the supporting substrate 38 and the supporting substrate 44 may be selected according to the composition or the like of each particle in the particle group 34.

The rear electrode 46 may be separated from the rear substrate 22 so that the rear electrode is located outside of the display medium 12. The front electrode 40 may be separated from the display substrate 20 so that the front electrode 40 is located outside the display medium 12.

Although both the display substrate 20 and the rear substrate 22 are provided with electrodes (the front electrode 40 and the rear electrode 46, respectively) in the above description, it is also possible to provide an electrode to either one of the display substrate 20 or the rear substrate 22 so as to perform active matrix driving.

In order to achieve active matrix driving, the supporting substrate 38 or the supporting substrate 44 may be provided with a TFT (thin film transistor) at each pixel. In consideration of ease of lamination of wiring and component mounting, it is preferable to form a TFT on the rear substrate 22 rather than on the display substrate.

Next, the treatment layer is described below. A treatment layer 21 and a treatment layer 23 are provided on surfaces of the display substrate 20 and the rear substrate 22, respectively, which oppose each other. In addition, a treatment layer 25 is formed on a surface (a surface at the cell interior side) of the spacing member 24.

Although a configuration in which both of a surface of display substrate 20 and a surface of rear substrate 22 that oppose each other are provided with treatment layers (treatment layers 21 and 23) is described in the present exemplary embodiment, an alternative configuration is possible in which a treatment layer is formed on either one of the surface of the display substrate 20 and the surface of the rear substrate 22 that oppose each other. A treatment layer (such as treatment layer 21) may be provided at least on the surface of the display substrate 20 that opposes the rear substrate 22 from the viewpoint of suppressing image defects caused by adhering and fixing of particles. When the treatment layer 25 is formed on a surface (a surface at the cell interior side) of the spacing member 24, adhering and fixing of particles to the spacing members 24 may be also suppressed compared with a case in which the treatment layer is not formed on the spacing member 24. As a result, the particles that do not contribute to display may be prevented from increasing. Therefore, it is preferable that the treatment layer is formed at least on the surface of the display substrate 20 that opposes the rear substrate, and it is more preferable that the treatment layer is formed on all of the pair of the substrates and the spacing member (that is, on the internal walls of the cell enclosed therewith).

The treatment layers 21, 23, and 25 are formed by treating the interior surfaces of the display substrate 20, the rear substrate 22, and the spacing member 25, respectively, with a polymer compound having a silicone chain. The treatment may be a treatment by which the polymer compound having a silicone chain is bonded chemically to the respective substrates and/or a treatment by which the polymer compound having a silicone chain covers the respective substrates.

The polymer compound having a silicone chain may be, for example, a compound in which a silicone chain (grafted silicone chain) as a side chain is incorporated in the main chain of a mother polymer compound. Specifically, the polymer compound is selected from, for example, a reactive silicone polymer compound or a non-reactive silicone polymer compound. The reactive silicone polymer compound forms a treatment layer by bonding to the substrate through a reactive group thereof, so that adhering and fixing of particles onto the opposing substrate surfaces may be suppressed over a long time, as compared with cases in which other kinds of compounds are used. On the other hand, the non-reactive silicone polymer compound forms a treatment layer simply by being coated and dried on the substrate, so that adhering and fixing of particles onto the opposing substrate surfaces may be suppressed with a simple treatment, as compared with cases in which other kinds of compounds are used.

The reactive silicone polymer compound is described first. The reactive silicone polymer compound may be, for example, a copolymer of monomers including at least a monomer having a silicone chain (hereinafter, referred to as (A) silicone chain component) and a monomer having a reactive group (hereinafter, referred to as (B) reactive component), and, optionally, one or more other monomers (hereinafter, referred to as (C) other copolymer components). Since this copolymer contains additional components other than the silicone chain component, the resultant treatment layer is not easily dissolved in a dispersion medium, as compared with other compounds. When the reactive silicone polymer compound is prepared only from the monomer having a silicone chain, the polymer compound is easily dissolved in a dispersing solvent (for example, silicone oil), so that the resultant treatment layer is easily degraded. Hereinafter, the respective monomers (components) are described.

(A) Silicone Chain Component

Examples of the silicone chain component include a dimethylsilicone monomer having a (meth)acrylate group at one terminal thereof (for example, SILAPLANE FM-0711, FM-0721, FM-0725 or the like manufactured by CHISSO CORP., or X-22-174DX, X-22-2426, X-22-2475 or the like manufactured by Shin-Etsu Silicone Corp.).

(B) Reactive Component

Examples of the reactive component include glycidyl (meth)acrylate having an epoxy group and an isocyanate monomer having an isocyanate group (KARENZ AOI or KARENZ MOI, manufactured by SHOWA DENKO K. K.).

(C) Other Copolymer Components

Examples of other copolymer components include an alkyl (meth)acrylate such as methyl(meth)acrylate, ethyl(meth)acrylate, propyl(meth)acrylate, or butyl(meth)acrylate; hydroxyethyl(meth)acrylate; hydroxybutyl(meth)acrylate; a monomer having an ethylene oxide unit such as a (meth)acrylate of alkyloxy oligoethyleneglycol (for example, tetraethyleneglycol monomethylether(meth)acrylate; polyethylene glycol having (meth)acrylate at one terminal thereof; (meth)acrylic acid; maleic acid; and N,N-dialkylamino (meth)acrylate.

Among the above, the component (A) and the component (B) are essential, and the components (C) may be optionally copolymerized. Regarding the copolymerization ratio of these three components, the amount of (A) the silicone chain component is preferably 50% by weight or more, and more preferably 80% by weight or more, with respect to the weight of the copolymer. When the proportion of non-silicone chain components is more than 50% by weight, surface activating ability may be decreased and the effect of preventing adhering and fixing of particles may be decreased. The amount of (B) the reactive component may be in the range of from 0.1% by weight to 10% by weight with respect to the weight of the copolymer. When the amount of the reactive component is more than 10% by weight, the reactive group may remain in the treatment layer and may affect the moving property (moving property) of the particles. When the amount of the reactive component is less than 0.1% by weight, the bonding of the reactive silicone polymer compound to the substrate surface may become incomplete. The ratio described above is a ratio of the amount of a substance added, as a raw material, for the synthesis of the polymer compound.

Besides the above copolymer, the reactive silicone polymer compound may alternatively be a silicone compound (a silicone compound represented by the following Formula 1) having an epoxy group at one terminal thereof The silicone compound having an epoxy group at one terminal thereof may be, for example, X-22-173DX manufactured by Shin-Etsu Silicone Corp.

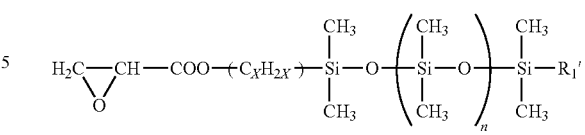

Formula (1)

In Formula 1, $R_1'$ represents a hydrogen atom or an alkyl group having 1 to 4 carbon atoms; n represents a natural number (for example from 3 to 100); and x represent an integer of from 1 to 3.

Among these, a copolymer formed from at least two components, including a dimethylsilicone monomer having a (meth)acrylate group at one terminal thereof (a silicone compound represented by the following Formula 2, such as SILAPLANE FM-0711, FM-0721, FM-0725 or the like manufactured by CHISSO CORP., or X-22-174DX, X-22-2426, X-22-2475 or the like manufactured by Shin-Etsu Silicone Corp.) and a glycidyl(meth)acrylate monomer or isocyanate monomer (KARENZ AOI or KARENZ MOI, manufactured by SHOWA DENKO K. K.) is preferable since the copolymer may have excellent reactivity and surfactant activating ability.

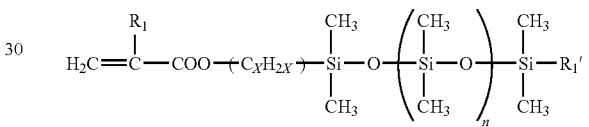

Formula 2

In Formula 2, $R_1$ represents a hydrogen atom or a methyl group; $R_1'$ represents a hydrogen atom or an alkyl group having 1 to 4 carbon atoms; n represents a natural number (for example, from 3 to 100); and x represents an integer of from 1 to 3.

The weight average molecular weight of the reactive silicone polymer compound is preferably from 500 to 1,000,000 and more preferably from 1,000 to 1,000,000.

When the substrates and the spacing member are formed of a material having a functional group that reacts with a reactive group of a reactive silicone polymer compound, a treatment layer including the reactive silicone polymer compound may be formed by performing a treatment in which the reactive silicone polymer compound directly reacts with the substrate and spacing member. On the other hand, when the substrates and the spacing member are formed of a material not having a functional group that reacts with a reactive group of a reactive silicone polymer compound, a treatment layer including the reactive silicone polymer compound may be formed by performing a treatment in which the reactive silicone polymer compound reacts with the substrate and the spacing member after the surfaces of the substrate and the spacing member are treated with an agent (for example, a silane coupling agent).

The agent is preferably a silane coupling agent, examples of which include vinyl trichlorosilane, vinyl tris(β-methoxyethoxy)silane, vinyl triethoxysilane, vinyl trimethoxysilane, γ-methacryloxypropyl trimethoxysilane, γ-mercaptopropyl trimethoxysilane, γ-chloropropyl trimethoxysilane, γ-glycidoxypropyl trimethoxysilane, and γ-glycidoxypropyl methyldiethoxysilane, N-β(aminoethyl) γ-aminopropyl trimethoxysilane, N-β(aminoethyl) γ-aminopropyl methyldimethoxysilane, and γ-aminopropyl triethoxysilane.

The thickness of the treatment layer formed from the reactive silicone polymer compound is, for example, from 0.001 µm to 10 µm (or from about 0.001 µm to about 10 µm) and preferably from 0.01 µm to 1 µm.

Next, the non-reactive silicone polymer compound is described below. The non-reactive silicone polymer compound may be, for example, a copolymer of monomers including at least a monomer having a silicone chain (hereinafter, referred to as (A') silicone chain component) and a monomer having no reactive group (hereinafter, referred to as (B') non-reactive component). Since this copolymer contains an additional component other than the silicone chain component, the resultant treatment layer is not easily dissolved in a dispersion medium, as compared with other compounds. When the reactive silicone polymer compound is prepared only from the monomer having a silicone chain, the polymer compound is easily dissolved in a dispersing solvent (for example, silicone oil), so that the resultant treatment layer is easily degraded. Hereinafter, the respective monomers (components) are described.

(A') Silicone Chain Component

Examples of the silicone chain component include a dimethylsilicone monomer having a (meth)acrylate group at one terminal thereof (for example, SILAPLANE FM-0711 FM-0721, FM-0725 or the like manufactured by CHISSO CORP., or X-22-174DX, X-22-2426, X-22-2475 or the like manufactured by Shin-Etsu Silicone Corp.).

(B') Non-Reactive Component

Examples of the non-reactive component include:

a (meth)acrylic ester having an aliphatic amino group such as N,N-dimethylaminoethyl(meth)acrylate, N,N-diethylaminoethyl(meth)acrylate, N,N-dibutylaminoethyl(meth)acrylate, N,N-hydroxyethylaminoethyl(meth)acrylate, N-ethylaminoethyl(meth)acrylate, N-octyl-N-ethylaminoethyl(meth)acrylate, or N,N-dihexylaminoethyl(meth)acrylate;

a (meth)acrylamide such as N-methyl acrylamide, N-octyl acrylamide, N-phenylmethyl acrylamide, N-cyclohexyl acrylamide, N-phenyl acrylamide, N-p-methoxy-phenyl acrylamide, N,N-dimethyl acrylamide, N,N-dibutyl acrylamide, or N-methyl-N-phenyl acrylamide;

an aromatic substituted ethylenic monomer having a nitrogen-containing group such as dimethylamino styrene, diethylamino styrene, dimethylamino methylstyrene, or dioctylamino styrene;

a nitrogen-containing vinylether monomer such as vinyl-N-ethyl-N-phenylaminoethyl ether, vinyl-N-butyl-N-phenylaminoethyl ether, triethanolamine divinyl ether, vinyldiphenylaminoethyl ether, N-vinylhydroxyethyl benzamide, or m-aminophenylvinyl ether;

a pyrrole such as N-vinylpyrrole;

a pyrroline such as N-vinyl-2-pyrroline or N-vinyl-3-pyrroline;

a pyrrolidine such as N-vinylpyrrolidine, vinylpyrrolidine aminoether, or N-vinyl-2-pyrrolidone;

an imidazole such as N-vinyl-2-methylimidazole;

an imidazoline such as N-vinylimidazoline;

an indole such as N-vinyl indole;

an indoline such as N-vinyl indoline;

a carbazole such as N-vinylcarbazole or 3,6-dibrome-N-vinylcarbazole;

a pyridine such as 2-vinylpyridine, 4-vinylpyridine, or 2-methyl-5-vinylpyridine;

a piperidine such as (meth)acrylpiperidine, N-vinylpiperidone, or N-vinylpiperazine;

a quinoline such as 2-vinylquinoline or 4-vinylquinoline;

a pyrazole such as N-vinylpyrazole or N-vinylpyrazoline;

an oxazole such as 2-vinyloxazole; and an oxazine such as 4-vinyloxazine or morpholinoethyl (meth)acrylate;

acrylic acid, methacrylic acid, crotonic acid, itaconic acid, maleic acid, fumaric acid, citraconic acid, or an anhydride or monoalkyl ester of any of these acids, or a vinyl ether having a carboxyl group such as carboxyethylvinyl ether or carboxypropylvinyl ether;

styrene sulfonic acid, 2-acrylamide-2-methylpropane sulfonic acid, 3-sulfopropyl(meth)acrylic acid ester, bis-(3-sulfopropyl)-itaconic acid ester or the like, or a salt of any of these compounds;

a sulfuric acid monoester of 2-hydroxyethyl(meth)acrylic acid or a salt thereof; and vinylphosphonic acid, vinylphosphate, acid phosphoxyethyl(meth)acrylate, acid phosphoxypropyl(meth)acrylate, bis(methacryloxyethyl)phosphate, diphenyl-2-methacryloxyethyl phosphate, diphenyl-2-acryloyloxyethyl phosphate, dibutyl-2-methacryloyloxyethyl phosphate, dibutyl-2-acryloyloxyethyl phosphate, or dioctyl-2-(meth)acryloyloxyethyl phosphate.

Regarding the copolymerization ratio of the above two components, the amount of (A) the silicone chain component is preferably from 0.01% to 95% by weight, and more preferably from 0.1% to 80% by weight, with respect to the weight of the copolymer. When the proportion of the silicone chain component is less than 0.01% by weight, surface activating ability may be decreased and the effect of preventing adhering and fixing of particles may be decreased. When the amount of the silicone chain component is more than 80% by weight, the copolymer may easily dissolve in a dispersion medium (for example, silicone oil), so that the treatment layer may be easily degraded. The ratio described above is a ratio of the amount of a substance added, as a raw material, for the synthesis of the polymer compound.

The treatment layer including the non-reactive silicone polymer compound may be formed by, for example, coating and drying a coating liquid containing the polymer compound on the substrates and the spacing member.

The thickness of the treatment layer formed from the non-reactive silicone polymer compound is, for example, from 0.01 µm to 10 µm (or from about 0.01 µm to about 10 µm), and preferably from 0.05 µm to 1 µm.

Next, the spacing member is described. The spacing member 24, which maintains the space between the display substrate 20 and the rear substrate 22, is formed such that the light-transmitting property of the display substrate 20 is not impaired, and may be formed from, for example, a thermoplastic resin, a thermosetting resin, an electron-beam-curable resin, a photo-curable resin, rubber, or a metal.

The spacing member 24 may be integrated with either of the display substrate 20 or the rear substrate 22. In this case, the integrated structure may be prepared by a process such as an etching process in which the supporting substrate 38 or 44 is etched, a laser processing, a press machining using an already-prepared mold, or a printing process.

In this case, the spacing member 24 may be formed at either one of the display substrate 20 side or the rear substrate 22 side, or at both sides.

The spacing member 24 may be colored or colorless, and is preferably colorless and transparent in order not to cause adverse effects on an image displayed on the display medium 12. In such a case, the spacing member may include a transparent resin, such as polystyrene, polyester, or an acrylic resin.

The spacing member 24, when they are in the form of particles, may be transparent; in this case, the spacing member 24 may include a glass particle or a transparent resin particle such as a particle of polystyrene, polyester, or an acrylic resin.

The term "transparent" indicates that the substance has a transmittance of 60% or more to visible light.

Next, the dispersion medium is described below. The dispersion medium 50 in which the particles 34 are dispersed may be an insulating liquid. Here, the term "insulating" means that the volume resistivity is $10^{11}$ Ω·cm or more. The same applies hereinafter.

Examples of the insulating liquid include: hexane, cyclohexane, toluene, xylene, decane, hexadecane, kerosene, paraffin, isoparaffin, silicone oil, dichloroethylene, trichloroethylene, perchloroethylene, high purity petroleum, ethyleneglycol, alcohols, ethers, esters, dimethyl formamide, dimethyl acetoamide, dimethyl sulfoxide, N-methylpyrrolidone, 2-pyrrolidone, N-methyl formamide, acetonitrile, tetrahydrofuran, propylene carbonate, ethylene carbonate, benzene, diisopropyl naphthalene, olive oil, isopropanol, trichlorotrifluoroethane, tetrachloroethane, dibromotetrafluoroethane, and a mixture of two or more thereof. Among these, silicone oil is preferably used. By using silicone oil, the silicone chain of the polymer compound that forms the treatment layer is more likely to be positioned at the dispersion medium 50 side, thereby enhancing the effect of preventing adhering and fixing of particles.

Further, by removing impurities so as to attain the following volume resistivity, water (so-called, pure water) may be used as the dispersion medium. The volume resistivity is preferably $10^3$ Ω·cm or more, more preferably from $10^7$ Ω·cm to $10^{19}$ Ω·cm, and still more preferably from $10^{10}$ Ω·cm to $10^{19}$ Ω·cm. When the volume resistivity is selected within this range, an electric field may be applied to the particles more effectively, and bubble generation through electrolysis of the liquid caused by electrode reactions may be suppressed; therefore, electrophoretic property of the particles may be not impaired by the respective voltage application operations, so that excellent repetition stability may be realized.

To the insulating liquid, one or more substances selected from the following may be added as required: an acid, an alkali, a salt, a dispersion stabilizer, a stabilizer for antioxidation, UV absorption, or the like, an antibacterial agent, and an antiseptic agent.

To the insulating liquid, a charge control agent may be added; the charge control agent may be selected from an anionic surfactant, a cationic surfactant, an amphoteric surfactant, a nonionic surfactant, a fluorochemical surfactant, a silicone surfactant, a metal soap, an alkyl phosphate, or a succinimide.

More specific examples of the ionic or nonionic surfactant include the following substances. Examples of the nonionic surfactant include polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, and fatty acid alkylol amide. Examples of the anionic surfactant include an alkylbenzene sulfonate, an alkylphenyl sulfonate, an alkylnaphthalene sulfonate, a higher fatty acid salt, a salt of a sulfuric ester of a higher fatty acid, and a sulfonic acid of a higher fatty acid ester. Examples of the cationic surfactant include a primary amine salt, a secondary amine salt, a tertiary amine salt, and a quaternary ammonium salt. The amount of the charge control agent is preferably from 0.01% by weight to 20% by weight, and particularly preferably from 0.05% by weight to 10% by weight, with respect to the solid amount of the particles. When the amount of the charge control agent is less than 0.01% by weight, a desired charge control effect is not obtained sufficiently in some cases. When the amount of the charge control agent is more than 20% by weight, the conductivity of the liquid may be excessively elevated, thereby making the liquid unsuitable for practical use.

The dispersion medium 50 may include a polymer resin in addition to the insulating liquid. The polymer resin may be a polymer gel, a high-molecular-weight polymer, or the like.

The polymer resin may be a polymer gel derived from a natural polymer or a synthetic polymer. The natural or synthetic polymer is not particularly limited. Examples of the natural polymer include agarose, agaropectin, amylose, sodium alginate, alginic acid propylene glycol ester, isolichenan, insulin, ethylcellulose, ethylhydroxyethylcellulose, curdlan, casein, carrageenan, carboxymethylcellulose, carboxymethyl starch, callose, agar, chitin, chitosan, silk fibroin, guar gum, queenseed, crown-gall polysaccharide, glycogen, glucomannan, keratan sulfate, keratin protein, collagen, cellulose acetate, gellan gum, schizophyllan, gelatin, ivory palm mannan, tunicin, dextran, dermatan sulfate, starch, tragacanth gum, nigeran, hyaluronic acid, hydroxyethylcellulose, hydroxypropylcellulose, pustulan, funoran, decomposed xyloglucan, pectin, porphyran, methylcellulose, methyl starch, laminaran, lichenan, lentinan, and locust bean gum.

Further, the polymer resin may be a polymer that contains, in a repetition unit thereof, a functional group selected from an alcohol, a ketone, an ether, an ester, or an amide. Examples of the polymer include polyvinyl alcohol, poly(meth)acrylamide or a derivative thereof, polyvinyl pyrrolidone, polyethylene oxide, and a copolymer containing two or more kinds of repetition units selected from the repetition units contained in these polymers.

Among these, from the viewpoint of production stability, electrophoretic property and others, the polymer resin is preferably gelatin, polyvinyl alcohol, or poly(meth)acrylamide.

In addition, when a colorant, such as those described below, is mixed in the dispersion medium 50, a color different from the color of the particles 34 is displayed on the display medium 12. For example, when the color of the particles 34 is black and a white colorant is mixed in the dispersion medium 50, the display medium 12 may be able to display white and black colors.

The colorant mixed with the dispersion medium 50 may be a known colorant, and examples thereof include: carbon black; titanium oxide; magnesium oxide; zinc oxide; phthalocyanine copper-based cyan colorants; azo-based yellow colorants; azo-based magenta colorants; quinacridone-based magenta colorants; red colorants; green colorants; and blue colorants. Specifically, typical examples thereof include aniline blue, chalcoil blue, chrome yellow, ultramarine blue, Dupont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, and C.I. pigment blue 15:3.

The particles 34 move in the dispersion medium 50. If the viscosity of the dispersion medium 50 exceeds a predetermined value, the force acting to the rear substrate 22 and the display substrate 20 varies largely, and it may be unable to determine an electric field threshold for the moving of the particles; therefore the viscosity of the dispersion medium 50 may be controlled.

The viscosity of the dispersion medium 50 in an environment at 20° C. may be from 0.1 mPa·s to 100 mPa·s, preferably from 0.1 mPa·s to 50 mPa·s, and more preferably from 0.1 mPa·s to 20 mPa·s, in consideration of the moving speed of the particles, namely, the display speed.

By adjusting the viscosity of the dispersion medium 50 to be within the range of from 0.1 mPa·s to 100 mPa·s, the variations in the flow resistance, the electrophoresis time and the adhesive force of the particles 34 dispersed in the dispersion medium 50 to the display substrate 20 or the rear substrate 22, may be suppressed.

The viscosity of the dispersion medium 50 may be controlled by regulating the molecular weight, structure, and composition of the dispersion medium. The viscosity is measured using a B-8L viscosity meter manufactured by TOKYO KEIKI INC.

Next, the particle group is described. The particle group 34 is composed of plural particles. The respective particles are charged positively or negatively, and move in the dispersion medium 50 upon application of a given voltage between the front electrode 40 and the rear electrode 46 (that is, between the display substrate 20 and the rear substrate 22) and consequent formation of an electric field having a given intensity between the display substrate 20 and the rear substrate 22.

The color displayed on the display medium 12 is changed by moving of the particles of the particle group 34 in the dispersion medium 50.

Examples of the particles 34 include: insulating metal oxide particles such as glass beads, alumina, or titanium oxide; thermoplastic or thermosetting resin particles; particles obtained by fixing a colorant on the surface of these resin particles; particles containing a colorant in thermoplastic or thermosetting resin; and metal colloid particles having a plasmon coloring.

Examples of the thermoplastic resin used for the production of the particles include: a homopolymer or copolymer of the following: a styrene such as styrene or chlorostyrene; a monoolefin such as ethylene, propylene, butylene, or isoprene; a vinyl ester such as vinyl acetate, vinyl propionate, vinyl benzoate, or vinyl butyrate; an α-methylene aliphatic monocarboxylic acid ester such as methyl acrylate, ethyl acrylate, butyl acrylate, dodecyl acrylate, octyl acrylate, phenyl acrylate, methyl methacrylate, ethyl methacrylate, butyl methacrylate, or dodecyl methacrylate; a vinyl ether such as vinyl methyl ether, vinyl ethyl ether, or vinyl butyl ether; and a vinyl ketone such as vinyl methyl ketone, vinyl hexyl ketone, or vinyl isopropenyl ketone.

Examples of the thermosetting resin used for the production of the particles include: a crosslinked resins such as a crosslinked copolymer containing divinyl benzene as a main component or a crosslinked polymethyl methacrylate; a phenol resin; a urea resin; a melamine resin; a polyester resin; and a silicone resin. Typical examples of the resin include polystyrene, a copolymer of styrene and an alkyl acrylate, a copolymer of styrene and an alkyl methacrylate, a copolymer of styrene and acrylonitrile, a copolymer of styrene and butadiene, a copolymer of styrene and maleic anhydride, a polyethylene, a polypropylene, a polyester, a polyurethane, an epoxy resin, a silicone resin, a polyamide, modified rosin, and paraffin wax.

The colorant in particles 34 may be selected from, for example, an organic or inorganic pigment or an oil-soluble dye. The colorant may be a known colorant, examples of which include: magnetic powder such as powder of magnetite or ferrite; carbon black; titanium oxide; magnesium oxide; zinc oxide; phthalocyanine copper-based cyan colorants; azo-based yellow colorants; azo-based magenta colorants; quinacridone-based magenta colorants; red colorants; green colorants; and blue colorants. Specifically, typical examples thereof include aniline blue, chalcoil blue, chrome yellow, ultramarine blue, Dupont oil red, quinoline yellow, methylene blue chloride, phthalocyanine blue, malachite green oxalate, lamp black, rose bengal, C.I. pigment red 48:1, C.I. pigment red 122, C.I. pigment red 57:1, C.I. pigment yellow 97, C.I. pigment blue 15:1, and C.I. pigment blue 15:3.

To the resin of the particles, a charge control agent may be added as necessary. The charge control agent may be a known charge control agent used in electrophotographic toner materials. Examples thereof include: quaternary ammonium salts such as cetylpyridyl chloride, BONTRON P-51, BONTRON P-53, BONTRON E-84 and BONTRON E-81 (manufactured by Orient Chemical Industries, Ltd.); salicylic acid metal complexes; phenol condensates; tetraphenyl compounds; metal oxide particles; and metal oxide particles whose surface has been treated with various kinds of coupling agents.

The inside or the surface of the particles may include a magnetic material, as necessary. The magnetic material may be an inorganic or organic magnetic material, which may have been color-coated (colored by coating) as required. Transparent magnetic materials, particularly transparent organic magnetic materials, are more preferable because they do not impede coloration by a colored pigment and have smaller specific gravities than those of inorganic magnetic materials.

Examples of the colored magnetic material include a small-diameter colored magnetic powder described in JP-A No. 2003-131420. The colored magnetic material may have a magnetic particle as a core and a colored layer disposed on the surface of the magnetic particle. The colored layer may be, for example, a layer containing a pigment or the like that colors the particle such that the particle becomes opaque. The colored layer may be an optical interference thin film. The optical interference thin film is obtained by forming a colorless material, such as $SiO_2$ or $TiO_2$, into a thin film having a thickness equivalent to the wavelength of light, so that the thin film selectively reflects lights of particular wavelengths by optical interference in the thin film.

An external additive may be attached to the surface of the particles, as necessary. The color of the external additive is preferably transparent so as not to affect the color of the particles.

The external additive may be inorganic particles, such as particles of a metal oxide (for example, silicon oxide (silica), titanium oxide, or alumina). In order to control the charging property, flow property, and environmental dependency of these particles, the surface thereof may be treated with a coupling agent or silicone oil.

Examples of the coupling agent include: a positively chargeable coupling agent such as an aminosilane coupling agent, an aminotitanium coupling agent, or a nitrile coupling agent; and a negatively chargeable coupling agent such as a silane coupling agent containing no nitrogen atom (i.e., composed of atoms other than nitrogen), a titanium coupling agent containing no nitrogen atom (i.e., composed of atoms other than nitrogen), an epoxy coupling agent, or an acrylsilane coupling agent. Examples of the silicone oil include a positively chargeable silicone oil such as amino-modified silicone oil, and a negatively chargeable silicone oil such as dimethylsilicone oil, alkyl-modified silicone oil, α-methylsulfone modified silicone oil, methylphenyl silicone oil, chlorophenyl silicone oil, or fluorine-modified silicone oil. The coupling agent may be selected from the above in accordance with a desired resistance of the external additive.

Among the above external additives, hydrophobic silica and hydrophobic titanium oxide, which are well-known in the art, are preferable. In particular, a titanium compound described in JP-A No. 10-3177, which is obtained by reacting $TiO(OH)_2$ with a silane compound such as a silane coupling agent, is preferable. As the silane compound, any of chlorosilane, alkoxysilane, silazane, or a special silylation agent may be used. The titanium compound is prepared by subjecting TiO(OH)$_2$ prepared in a wet process to a reaction with a silane compound or silicone oil, followed by drying. Since the titanium compound is prepared without performing a sintering step at several hundred degrees, so that strong bonds among Ti atoms are not formed, no aggregation occurs, and the resultant particles remains in a primary particle state. In addition, because the silane compound or silicone oil is directly reacted with TiO(OH)$_2$, the amount of the silane compound or silicone oil used in the processing may be increased. Therefore, the charging property of the particles may be regulated by controlling, for example, the amount of the silane compound used in the processing, and the imparted chargeability may be remarkably improved as compared with the chargeability of conventional titanium oxides.

The primary particles of the external additive may have a size of usually from 1 nm to 100 nm and more preferably from 5 nm to 50 nm. The size of the primary particle is not limited to the above ranges.

The mixing ratio of the external additive to the electrophoretic particles is adjusted in accordance with the diameter of the electrophoretic particles and the diameter of the particles of the external additive. When the addition amount of the external additive is too much, at least some of the external additive particles drop off the surface of the electrophoretic particles and attach to the surface of other electrophoretic particles, so that a desired charging property may not be obtained. Usually, the amount of the external additive is from 0.01 part to 3 parts by weight, and more preferably from 0.05 part to 1 part by weight, with respect to 100 parts by weight of the electrophoretic particles.

When plural electrophoretic particles are used, the external additive may be added to any one of the plural kinds of electrophoretic particles, or to two or more kinds of the plural kinds of electrophoretic particles, or to all of the plural kinds of the electrophoretic particles. When the external additive is added to the surface of all of the particles, the external additive is preferably firmly fixed to the surface of the electrophoretic particles by, for example, embedding the particles of the external additive in the surface of the electrophoretic particles using an impact force or by heating the surface of the electrophoretic particles. When the external additive is thus firmly fixed to the surface of the electrophoretic particles, formation of aggregates of particles of external additives, which are formed through separation of external additive particles from the electrophoretic particles and aggregation of particles of external additives having the opposite polarities from each other and which are not easily disassembled by an electric field, may be prevented. As a result, deterioration in image quality may be prevented.

The method of preparing the group of particles 34 may be any known method. For example, a method as described in JP-A No. 7-325434 may be used, in which a resin, a pigment, and a charge control agent are weighed in a predetermined mixing ratio, the resin is fused by heating, and then the pigment is added, mixed and dispersed, and then the mixture is cooled, and then particles are prepared using a pulverizer such as a jet mill, a hammer mill or a turbo mill, and then the resultant particles are dispersed in a dispersion medium. Alternatively, particles containing a charge control agent therein may be prepared by a polymerization method such as suspension polymerization, emulsion polymerization or dispersion polymerization, coacervation, melt dispersion, or emulsion flocculation; then, the resultant particles may be dispersed in a dispersion medium to provide a medium in which the particles are dispersed therein. Further, in another method, an appropriate apparatus is used to disperse and knead ingredients including a resin, a colorant, a charge control agent, and a dispersion medium at a temperature at which the resin is plasticized but the dispersion medium is not boiled, wherein the temperature is lower than the decomposition temperature of at least one of the resin, charge control agent, or colorant. Specifically, the pigment, resin and charge control agent are heated and fused in a dispersion medium while mixed by a planetary mixer, a kneader or the like, and then the fused mixture is cooled under stirring, whereby particles are solidified and precipitated due to the temperature dependency of the solubility of the resin in the solvent.

In still another method, the above ingredients are charged in an appropriate vessel equipped with a granular medium for dispersing and kneading (for example, an attritor or a heated vibrating mill such as a heated ball mill); then dispersing and kneading is performed in the vessel in a desired temperature range (for example from 80° C. to 160° C.). As the granular medium, a steel such as stainless steel or carbon steel, alumina, zirconia, silica, or the like may be used. When the particles are prepared by this method, the ingredients that are made fluid in advance are further dispersed in the vessel with the granular medium, and then the dispersion medium is cooled so as to precipitate the resin containing the colorant out of the dispersion medium. The granular medium is kept moving during and after cooling, so that a shearing force and/or an impact force is generated and the particle size is reduced thereby.

The content ratio of the group of particles 34 (content (% by weight) with respect to the total weight of the substances in the cell) is not particularly limited as long as a desired hue is obtained at the content ratio. In the display medium 12, the content ratio may be adjusted in accordance with the thickness of the cell (that is, the distance between the display substrate 20 and the rear substrate). For example, in order to attain a desired hue, the content ratio may be decreased as the cell thickness is increased, and the content ratio may be increased as the cell thickness is decreased. Usually, the content ratio is from 0.01% to 50% by weight.

Next, the group of large-diameter colored particles is described below. The group of large-diameter colored particles 36 is a group of particles which are not charged, which are large-particle-diameter colored particles having optical reflective characteristics different from those of the particle group 34, and which function as a reflection member that displays a color different from that of the particle group 34. The group of large-diameter colored particles also has a function as a cavity member through which the particles 34 move between the display substrate 20 and the rear substrate 22 without being impeded by the large-diameter colored particles.

Specifically, the group of large-diameter colored particles 36 are, for example, particles that have a diameter larger than that of the particles in the particle group 34, that is colored with a color different from that of the particles 34, and that is a member allowing the display medium 12 to display a color different from that of the particles 34. Although the description is given assuming that the large-diameter colored particles 36 are white in the present exemplary embodiment, the color thereof is not limited thereto.

The large-diameter colored particles 36 may be, for example, particles in which a white pigment such as titanium oxide, silicon oxide, or zinc oxide is dispersed in polystyrene, polyethylene, polypropylene, polycarbonate, PMMA, acrylic resin, phenol resin, a formaldehyde condensate, or the like. When the large-diameter colored particles 36 are non-white particles, they may be particles in which a pigment or dye of a desired color is included in the above-mentioned resin particles. As the pigment or dye, common pigments or dyes currently used for printing inks or color toners may be used insofar as they have, for example, RGB colors or YMC colors.

The large-diameter colored particles 36 are enclosed in the space between the substrates by, for example, an ink jet method. In order to immobilize the large-diameter colored particles 36, for example, after the large-diameter colored particles 36 are enclosed, the large-diameter colored particles 36 are heated (and optionally pressurized) so that the surface layer of the group of large-diameter colored particles 36 is melted; as a result, the large-diameter colored particles 36 are immobilized with the gaps between the particles maintained.

The dimension of the cell in the display medium 12 closely relates to the resolution of the display medium 12. When the cell is smaller, the produced display medium 12 may display an image of a higher resolution. In general, the length in the substrate surface direction of the display substrate 20 of the display medium 12 (the length of the cell) is from about 10 μm to about 1 mm.

The display substrate 20 and the rear substrate 22 may be fixed to each other via the spacing member 24, using a bolt and a nut in combination, or using a fixing member such as a clamp, a clip, or a frame for fixing a substrate, or using an adhesive, thermal melting, or ultrasonic bonding.

The display medium 12 thus structured may be used for a bulletin board, a circular bulletin, an electronic blackboard, an advertisement, a signboard, a flashing sign, electronic paper, an electronic newspaper, an electronic book, a document sheet usable with both a copying machine and a printer, and the like, each of which allows storage and rewriting of an image.

As described above, the display device 10 according to the present exemplary embodiment contains the display medium 12, a voltage applying unit 16 which applies a voltage to the display medium 12, and a controller 18 (see FIG. 1).

The voltage applying unit 16 is electrically connected to the front electrode 40 and the rear electrode 46. In the present exemplary embodiment, the description is given assuming that both the front electrode 40 and the rear electrode 46 are electrically connected to the voltage applying unit 16. However, the structure is not limited thereto, and may be a structure in which one of the front electrode 40 or the rear electrode 46 is grounded and the other one of the front electrode 40 or the rear electrode 46 is connected to the voltage applying unit 16.

The voltage applying unit 16 is connected to the controller 18 such that the voltage applying unit 16 can transmit a signal to the controller 18 and receive a signal from the controller 18.

The controller 18 may be configured as a microcomputer containing a CPU (central processing unit) which manages the operation of the whole apparatus, a RAM (Random Access Memory) which temporarily stores various data, and a ROM (Read Only Memory) in which various programs, such as a control program for controlling the whole apparatus, are stored in advance.

The voltage applying unit 16 is a voltage applying device that applies a voltage to the front electrode 40 and the rear electrode 46, and applies a voltage, according to the control of the controller 18, between the front electrode 40 and the rear electrode 46.

Next, the action of the display device 10 will be described. The action will be described according to the operation of the controller 18.

In the description below, it is assumed that the particles 34 enclosed in the display medium 12 are black and are negatively charged, that the dispersion medium 50 is transparent, and that the large-diameter colored particles 36 are white. More specifically, in the present exemplary embodiment, the description is given to a case in which the display medium 12 displays black or white depending on the movement of the particles 34.

First, an initial action signal which instructs a voltage to be applied for a given time such that the front electrode 40 becomes a negative electrode and the rear electrode 46 becomes a positive electrode is output to the voltage applying unit 16. When a voltage which has such a polarity and which is equal to or higher than a threshold voltage at which concentration change is completed is applied between the substrates, the negatively-charged particles 34 move to the rear substrate 22 side to reach the rear substrate 22 (see FIG. 2A).

In this state, the color of the display medium 12 visually recognized from the display substrate 20 side is white, which is the color of the large-particle-diameter colored particles 36.

The time T1 may be stored beforehand in, for example a memory (not shown) such as ROM in the controller 18 as information indicating a voltage application time in the voltage application in the initial action. Then, when the process is carried out, the information indicating the predetermined time may be read out.

Next, a voltage is applied between the front electrode 40 and the rear electrode 46 at a polarity that is opposite to the polarity of the voltage applied in the initial action; in other words, the front electrode 40 becomes a positive electrode and the rear electrode 46 becomes a negative electrode this time. As a result, the particles 34 move towards the display substrate 20 side and reach the display substrate 20 side, whereby black, which is the color of the particles 34, is displayed as shown in FIG. 2B.

In this way, in the display device 10 according to the present exemplary embodiment, display is achieved by moving and attachment of the particles 34 to the display substrate 20 or the rear substrate 22. Since the surfaces of the display substrate 20 and the rear substrate 22 that oppose each other have the treatment layers 21 and 23 of a polymer compound having a silicone chain, adhesion and fixing of the particles 34 may be suppressed by the presence of the silicone chain even when the particles 34 move and attach to the surfaces. As a result, color reproducibility and high contrast may be achieved.

Second Exemplary Embodiment

Figure 3:
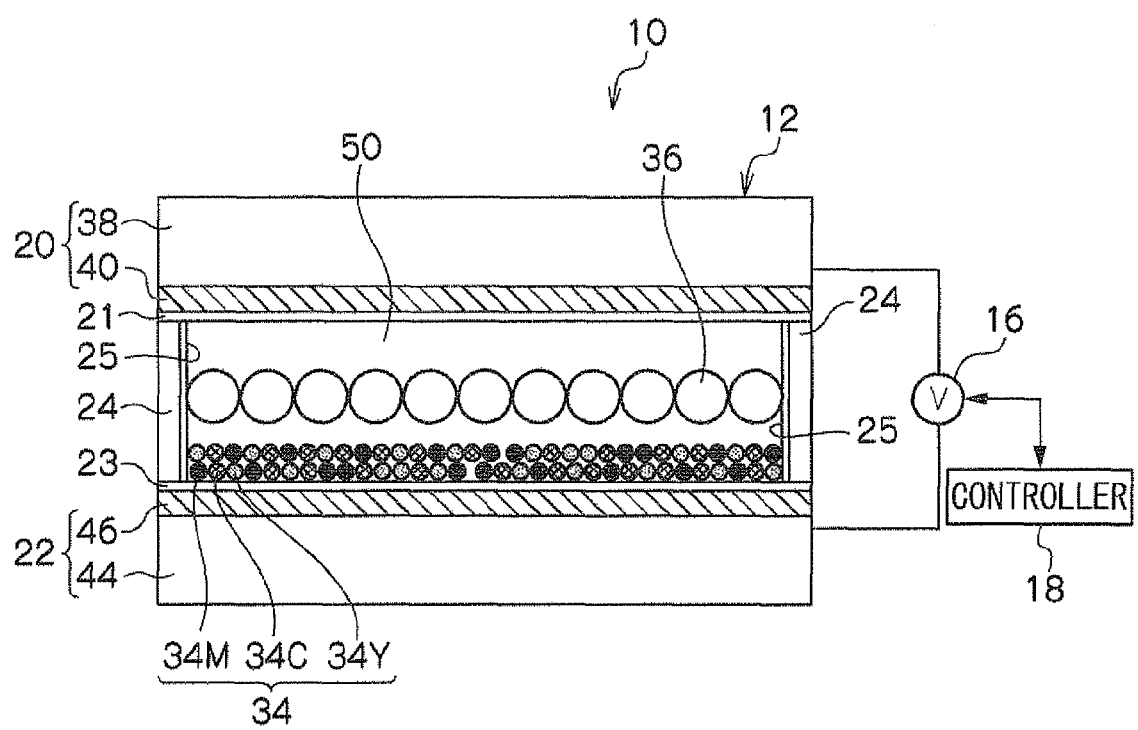
FIG. 3 is a schematic view of a display device according to a second exemplary embodiment of the present invention.
Figure 4:
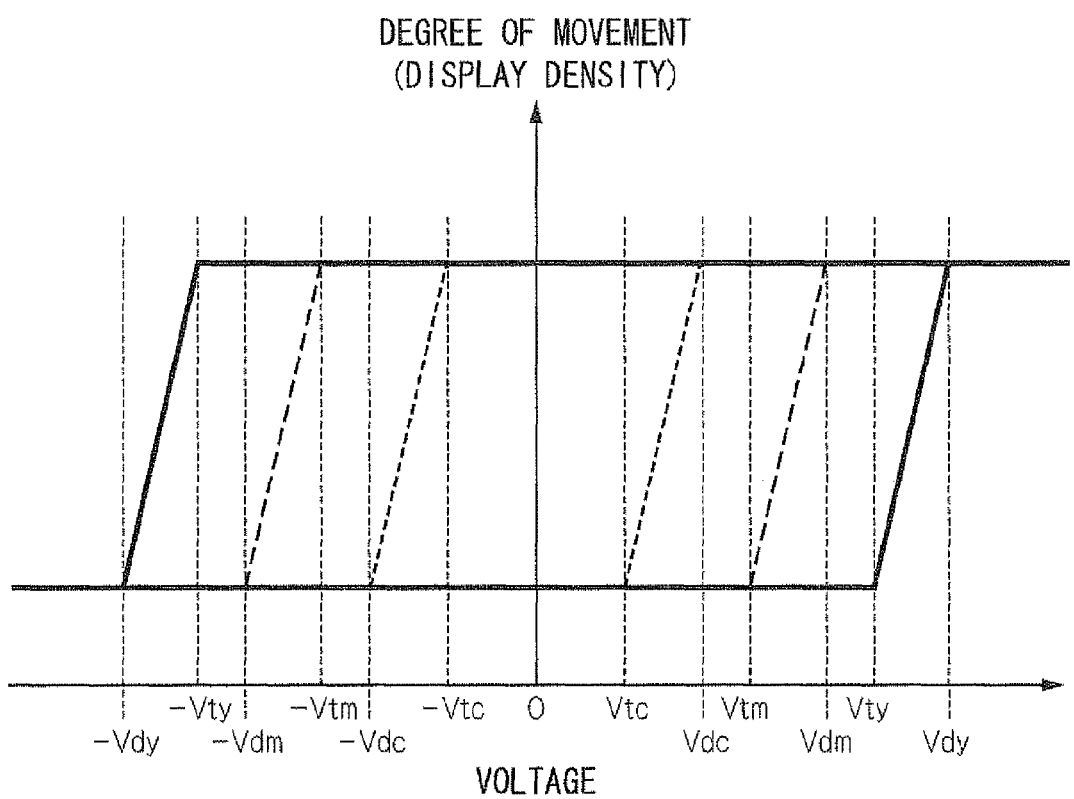
FIG. 4 is a diagram schematically showing a relationship between an applied voltage and a degree of movement of particles (display density) in a display device according to the second exemplary embodiment.
Figure 5:
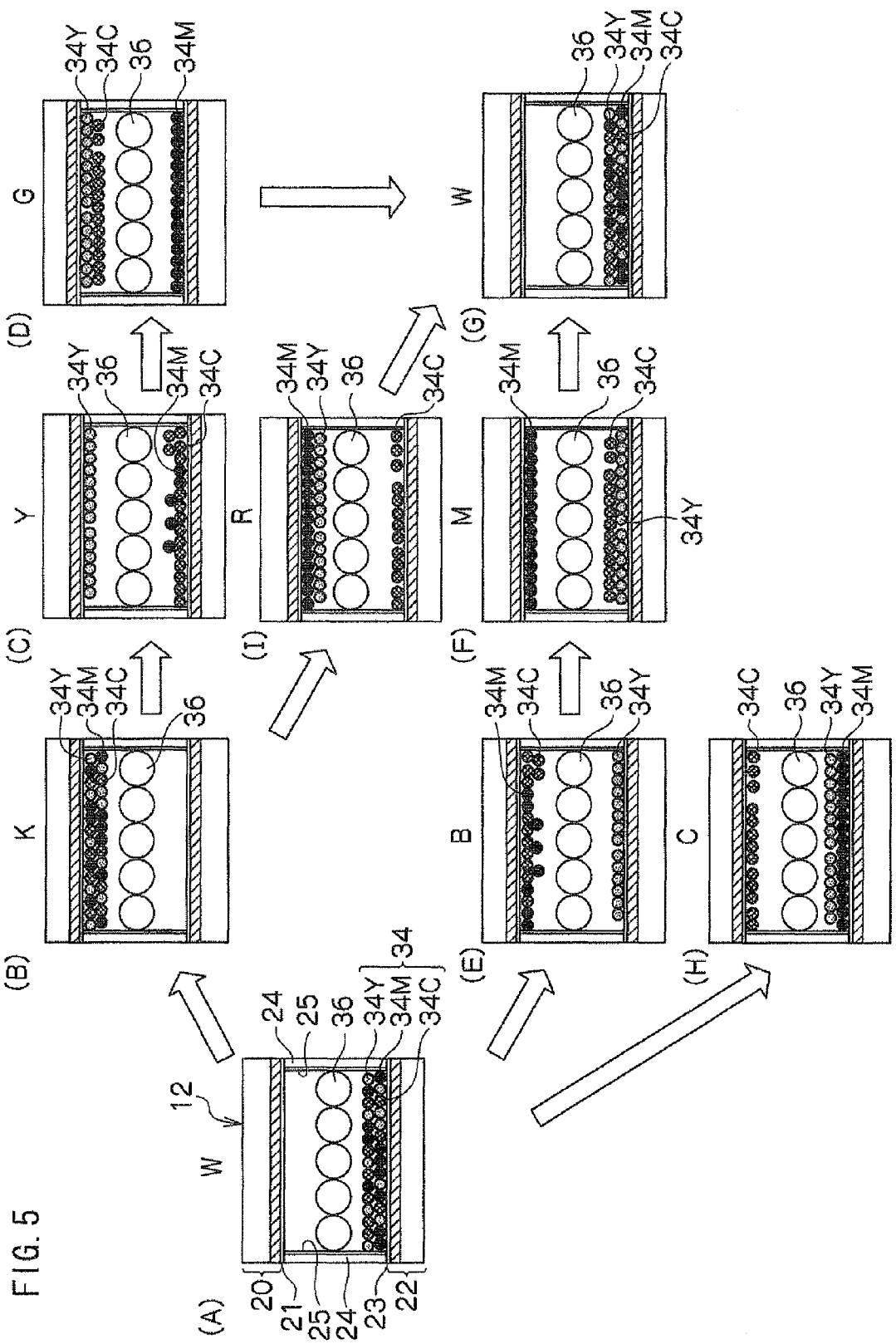
FIG. 5 is an illustration schematically showing a relationship between a mode of voltage applied between the substrates of a display medium and a moving mode of particles.

FIG. 3 is a schematic configuration diagram of the display device according to the second exemplary embodiment. FIG. 4 is a diagram schematically illustrating the relationship between a voltage to be applied and the degree of movement (display density) of particles in the display device according to the second exemplary embodiment. FIG. 5 is a view schematically illustrating the relationship between an application manner of a voltage applied between the substrates of the display medium and the movement manner of particles in the display device according to the second exemplary embodiment.

A display device 10 according to the second exemplary embodiment has a configuration in which two or more kinds of particle groups are applied. The two or more kinds of particle groups are charged with the same polarity.

The display device 10 according to the present exemplary embodiment contains a display medium 12, a voltage applying unit 16 which applies a voltage to the display medium 12, and a controller 18, as shown in FIG. 3.

The display device 10 according to the present exemplary embodiment has a structure similar to that of the display device 10 described in the first exemplary embodiment above. Thus, the same elements are designated by the same reference numeral and detailed description therefor is omitted.

The display medium 12 contains a display substrate 20 serving as an image display surface, a rear substrate 22 facing the display substrate 20 with a gap therebetween, a spacing member 24 which holds these substrates to maintain a given spacing therebetween and divides the space between the display substrate 20 and the rear substrate 22 into plural cells, a group of particles 34 enclosed in the respective cells, and a group of large-diameter colored particles 36 enclosed in the respective cells and having optical reflective properties different from those of the particles 34.

The surfaces of the display substrate 20 and the rear substrate 22 that oppose each other are subjected to chargeability-imparting treatment, similarly to the first exemplary embodiment. On the substrate surfaces that oppose each other, a treatment layer 21 and a treatment layer 23 are formed respectively.

In the present exemplary embodiment, the particles 34 include plural kinds of particle groups that are different in color from each other and are dispersed in the dispersion medium 50.

In the present exemplary embodiment, description is given assuming that the particles 34 include three kinds of particle groups 34 having different colors from each other; namely yellow particles 34Y having a yellow color, magenta particles 34M having a magenta color, and cyan particles 34C having a cyan color are dispersed. However, the number of the kinds of the particles 34 is not limited to three.

The plural kinds of particle groups 34 are particle groups which electrophoretically move between the substrates, and the absolute value of the voltage required for moving the particles according to the electric field is different among the respective particle groups having the respectively different colors. More specifically, each of the particle groups 34 having the different colors (yellow particle group 34Y, magenta particle group 34M, and cyan particle group 34C) has a voltage range required for moving the particle group 34, and the voltage ranges of the respective particle groups are different from each other.

In the preparation of the particles of each kind of the plural kinds of particles 34 that are different in the absolute value of a voltage required for moving according to an electric field, particle dispersion liquids are prepared; the charge amount per particle of particles contained in the respective particle dispersion liquids is varied between dispersion liquids by, for example, changing the amount of, for example, at least one of the charge control agent or the magnetic powder among the materials forming the particles 34 described in the first exemplary embodiment and/or changing the type and the concentration of the resin forming the particles. The prepared particle dispersion liquids are then mixed with each other.

As described above, three kinds of particle groups 34 the yellow particle group 34Y, the magenta particle group 34M, and the cyan particle group 34C having different colors from each other—are dispersed in the display medium 12 according to the present exemplary embodiment. In the plural kinds of particle groups 34, the absolute value of the voltage required for moving according to an electric field is varied between particle groups having the different colors.

In the present exemplary embodiment, regarding the absolute values of the voltages at which the respective particle groups of three colors start moving, the absolute value of the voltage at which the magenta particles 34M in magenta start moving is designated as "|Vtm|", the absolute value of the voltage at which the cyan particles 34C in cyan start moving is designated as "|Vtc|", and the absolute value of the voltage at which the yellow particles 34Y in yellow start moving is designated as "|Vty|". Moreover, regarding the absolute value of the maximum voltage for moving almost all the particles of each of the particle groups having three colors, the absolute value of the maximum voltage for moving almost all the magenta particles 34M in magenta is designated as "|Vdm|", the absolute value of the maximum voltage for moving almost all the cyan particles 34C in cyan is designated as "|Vdc|", and the absolute value of the maximum voltage for moving almost all the yellow particles 34Y in yellow is designated as "|Vdy|".

The description is given based on an assumption that the absolute values of Vtc, −Vtc, Vdc, −Vdc, Vtm, −Vtm, Vdm, −Vdm, Vty, −Vty, Vdy, and −Vdy described below satisfy the relationship, |Vtc|<|Vdc|<|Vtm|<|Vdm|<|Vty|<|Vdy|.

Specifically, as shown in FIG. 4, the three kinds of particles 34 are, for example, dispersed in a dispersion medium 50 and are all charged with the same polarity. When the absolute value of a voltage required for moving the cyan particles 34C is designated as "Vc", the absolute value of a voltage required for moving the magenta particles 34M is designated as "Vm", and the absolute value of a voltage required for moving the yellow particles 34Y is designated as "Vy", the range of the absolute value of Vc (|Vtc|≦Vc≦Vdc|; the absolute value of a voltage between Vtc and Vdc (inclusive)) is at a lower voltage side of the range of the absolute value of Vm (|Vtm|≦Vm≦Vdm|; the absolute value of a voltage between Vtm and Vdm (inclusive)) without overlap therebetween, and the range of the absolute value of Vm (|Vtm|≦Vm≦Vdm|; the absolute value of a voltage between Vtm and Vdm (inclusive)) is at a lower voltage side of the range of the absolute value of Vy (|Vty|≦Vy≦Vdy|; the absolute value of a voltage between Vty and Vdy (inclusive)) without overlap therebetween.

In order to independently drive the respective particle groups 34 having the different colors, the absolute value |Vdc| of the maximum voltage for moving almost all the cyan particles 34C is smaller than the range of the absolute value of a voltage required for moving the magenta particles 34M (|Vtm|≦Vm≦Vdm|; the absolute value of a voltage between Vtm and Vdm (inclusive)) and the range of the absolute value of a voltage required for moving the yellow particles 34Y (|Vty|≦Vy≦Vdy|; the absolute value of a voltage between Vty and Vdy (inclusive)). The absolute value |Vdm| of the maximum voltage for moving almost all the magenta particle groups 34M is smaller than the range of the absolute value of a voltage required for moving the yellow particles 34Y (|Vty|≦Vy≦Vdy|; the absolute value of a voltage between Vty and Vdy (inclusive))

More specifically, in the present exemplary embodiment, the respective voltage ranges required for moving the respective particle groups 34 having the different colors are controlled so as not to overlap with each other, so that the particle groups 34 having the different colors are independently driven.

The "voltage range required for moving the particles 34" refers to a voltage range from a voltage required for the particles to start moving to a voltage at which the display density ceases to be changed even by increasing the voltage and the voltage application time from initiation of the moving, and is saturated.

The "maximum voltage required for moving almost all the particles 34" refers to a voltage at which the display density ceases to be changed even by increasing the voltage and the voltage application time from initiation of the moving, and is saturated.

The "almost all" refers to presence of some of the particles 34 having such properties as not to contribute to display properties, which occur due to variation within the particle group of a particular color. When "almost all the particle 34 move", the particles are in a state in which the display density ceases to be changed even by increasing the voltage and the voltage application time from initiation of the moving, and is saturated.

The "display density" refers to a color density on the display surface side measured by a reflection density manufactured by X-rite while a voltage is applied between the display surface side and the rear side; the color density is measured as an optical density (OD).

In the display medium 12 according to the present exemplary embodiment, when a voltage applied between the display substrate 20 and the rear substrate 22 is gradually increased from 0 V and exceeds $+Vtc$, the display density starts to change due to the moving of the cyan particles 34C in the display medium 12. When the voltage applied between the substrates is further increased to $+Vdc$, the change in display density due to the moving of the cyan particles 34C stops in the display medium 12.

When the voltage applied between the display substrate 20 and the rear substrate 22 is further increased to exceed $+Vtm$, the display density starts to change due to the moving of the magenta particles 34M in the display medium 12. When the voltage applied between the display substrate 20 and the rear substrate 22 is further increased to $+Vdm$, the change in display density due to the moving of the magenta particles 34M stops in the display medium 12.

When the voltage applied between the substrates is further increased to exceed $+Vty$, the display density starts to change due to the moving of the yellow particles 34Y in the display medium 12. When the voltage applied between the substrates is further increased to $+Vdy$, the change in display density due to the moving of the yellow particles 34Y stops in the display medium 12.

In contrast, when a negative voltage is applied between the display substrate 20 and the rear substrate 22 and the absolute value thereof is gradually increased from 0 V to exceed the absolute value of $-Vtc$, the display density starts to change due to the moving of the cyan particles 34C between the substrates in the display medium 12. When the absolute value of the voltage is further increased and the voltage applied between the display substrate 20 and the rear substrate 22 becomes $-Vdc$, the change in display density due to the moving of the cyan particles 34C stops in the display medium 12.

When the absolute value of the negative voltage applied between the display substrate 20 and the rear substrate 22 is further increased to exceed the absolute value of $-Vtm$, the display density starts to change due to the moving of the magenta particles 34M in the display medium 12. When the absolute value of the voltage is further increased and the voltage applied between the display substrate 20 and the rear substrate 22 becomes $-Vdm$, the change in display density due to the moving of the magenta particles 34M stops in the display medium 12.

When the absolute value of the negative voltage applied between the display substrate 20 and the rear substrate 22 is further increased to exceed the absolute value of $-Vty$, the display density starts to change due to the moving of the yellow particles 34Y in the display medium 12. When the absolute value of the voltage is further increased and the voltage applied between the substrates becomes $-Vdy$, the change in display density due to the moving of the yellow particles 34Y stops in the display medium 12.

More specifically, in the present exemplary embodiment, when a voltage within the range of from $-Vtc$ to $+Vtc$ (voltage range of $|Vtc|$ or lower) is applied between the display substrate 20 and the rear substrate 22, it is considered that the particles of the particle groups 34 (cyan particles 34C, magenta particles 34M, and yellow particles 34Y) do not move to such a degree as to change the display density of the display medium 12 as shown in FIG. 4. When a voltage higher (in terms of absolute value) than the voltage $+Vtc$ or $-Vtc$ is applied between the substrates, the cyan particles 34C among the particle groups 34 having three colors start to move to such a degree as to change the display density of the display medium 12, so that the display density starts to change. When a voltage higher (in terms of absolute value) than the voltage $-Vdc$ or $Vdc$ is applied, the display density ceases to change.

When a voltage within the range of from $-Vtm$ to $+Vtm$ (voltage range of $|Vtm|$ or lower) is applied between the display substrate 20 and the rear substrate 22, it is considered that the magenta particles 34M and the yellow particles 34Y do not move to such a degree as to change the display density of the display medium 12. When a voltage higher (in terms of absolute value) than the voltage $+Vtm$ or $-Vtm$ is applied between the substrates, the magenta particles 34M among the magenta particles 34M and the yellow particle groups 34Y start to move to such a degree as to change the display density of the display medium 12, so that the display density starts to change. When a voltage higher (in terms of absolute value) than the voltage $-Vdm$ or $Vdm$ is applied, the display density ceases to change.

When a voltage within the range of from $-Vty$ to $+Vty$ (voltage range of $|Vty|$ or lower) is applied between the display substrate 20 and the rear substrate 22, it is considered that the yellow particles 34Y do not move to such a degree as to change the display density of the display medium 12. When a voltage higher (in terms of absolute value) than the voltage $+Vty$ or $-Vty$ is applied between the substrates, the yellow particles 34M start to move to such a degree as to change the display density of the display medium 12, so that the display density starts to change. When a voltage higher (in terms of absolute value) than the voltage $-Vdy$ or $Vdy$ is applied, the display density ceases to change.

Next, the mechanism of the movement of the particles when an image is displayed on the display medium 12 will be described with reference to FIG. 5.

The following description will be given, as an example, based on an assumption that the yellow particles 34Y, the magenta particles 34M, and the cyan particles 34C, which are described above with reference to FIG. 4, are enclosed as the plural kinds of particles 34 in the display medium 12.

In the following description, a voltage to be applied between the substrates which is higher than the absolute value of the voltage required for starting the moving of the particles of the yellow particle group 34Y but is equal to or lower than the above-mentioned maximum voltage for the yellow particle group 34Y is referred to as a "large voltage", a voltage to be applied between the substrates which is higher than the absolute value of the voltage required for starting the moving of the particles of the magenta particle group 34M but is equal to or lower than the maximum voltage for the magenta particle group 34M is referred to as a "medium voltage", and a voltage to be applied between the substrates which is higher than the absolute value of the voltage required for starting the moving of the particles of the cyan particle group 34C but is equal to or lower than the maximum voltage for the magenta particle group 34C is referred to as a "small voltage".

When a voltage is applied between the substrates such that the display substrate 20 side has a higher electric potential than that of the rear substrate 22 side, the respective voltages mentioned above are referred to as a "+large voltage", a "+medium voltage", and a "+small voltage", respectively. When a voltage is applied between the substrates such that the rear substrate 22 has a higher electric potential than that of the display substrate 20, the respective voltages mentioned above are referred to as a "−large voltage", a "−medium voltage", and a "−small voltage", respectively.

As shown in FIG. 5(A), in this example of the process, it is assumed that all the particle groups—the magenta particle group 34M, the cyan particle group 34C, and the yellow particle group 34Y—are located at the rear substrate 22 side in the initial state to display a white color. Starting from this initial state, when a "+large voltage" is applied between the display substrate 20 and the rear substrate 22, all of the particle groups—the magenta particle group 34M, the cyan particle group 34C, and the yellow particle group 34Y—move to the display substrate 20 side. Even when the application of voltage is stopped in this state, the respective particle groups remain attached to the display substrate 20 side and do not move, so that display of black continues due to subtractive color mixture of the magenta particle group 34M, the cyan particle group 34C, and the yellow particle group 34Y (subtractive color mixture of magenta, cyan, and yellow, see FIG. 5(B)).

Next, when a "−medium voltage" is applied between the display substrate 20 and the rear substrate 22 in the state shown in FIG. 5(B), the magenta particle group 34M and the cyan particle group 34C among the particle groups 34 of all the colors move to the rear substrate 22 side. Therefore, only the yellow particles 34Y remain attached to the display substrate 20 side, so that a yellow color is displayed (see FIG. 5 (C)).

When a "+small voltage" is applied between the display substrate 20 and the rear substrate 22 in the state shown in FIG. 5(C), the cyan particle group 34C among the magenta particle group 34M and the cyan particle group 34C, which have moved to the rear substrate 22 side, moves to the display substrate 20 side. Therefore, only the yellow particle group 34Y and the cyan particle group 34C are attached to the display substrate 20 side, so that a green color is displayed due to subtractive color mixture of yellow and cyan (see FIG. 5 (D)).

When a "−small voltage" is applied between the display substrate 20 and the rear substrate 22 in the state shown in FIG. 5(B), the cyan particle group 34C among all the particle groups 34 moves to the rear substrate 22 side. Therefore, the yellow particle group 34Y and the magenta particle group 34M are attached to the display substrate 20 side, so that a red color is displayed due to subtractive color mixture of yellow and magenta (see FIG. 5 (I)).

When a "+medium voltage" is applied between the display substrate 20 and the rear substrate 22 in the initial state shown in FIG. 5(A), the magenta particle group 34M and the cyan particle group 34C among all the particle groups 34 (magenta particle group 34M, cyan particle group 34C, and yellow particle group 34Y) move to the display substrate 20 side. Therefore, the magenta particle group 34M and the cyan particle group 34C are attached to the display substrate 20 side, so that a blue color is displayed due to subtractive color mixture of magenta and cyan (see FIG. 5 (E)).

When a "−small voltage" is applied between the display substrate 20 and the rear substrate 22 in the state shown in FIG. 5 (E), the cyan particle group 34C among the magenta particle group 34M and the cyan particle group 34C attached to the display substrate 20 side move to the rear substrate 22 side.

Therefore, only the magenta particle group 34M is attached to the display substrate 20 side, so that a magenta color is displayed (see FIG. 5 (F)).

When a "−large voltage" is applied between the display substrate 20 and the rear substrate 22 in the state shown in FIG. 5 (F), the magenta particle group 34M attached to the display substrate 20 side moves to the rear substrate 22 side. Therefore, nothing is attached to the display substrate 20 side, so that a white color, which is the color of the large-diameter colored particles 36, is displayed (see FIG. 5 (G)).

When a "+small voltage" is applied between the display substrate 20 and the rear substrate 22 in the initial state shown in FIG. 5 (A), the cyan particle group 34C among all the particle groups 34 (magenta particle group 34M, cyan particle group 34C, and yellow particle group 34Y) moves to the display substrate 20 side. Therefore, the cyan particle group 34C is attached to the display substrate 20 side, so that a cyan color is displayed (refer to FIG. 5 (H)).

When a "−large voltage" is applied between the display substrate 20 and the rear substrate 22 in the state shown in FIG. 5 (I), all the particle groups 34 gather at the rear substrate 22 side as shown in FIG. 5 (G). Thus, a white color is displayed.

Similarly, when a "−large voltage" is applied between the display substrate 20 and the rear substrate 22 in the state shown in FIG. 5 (D), all the particle groups 34 gather at the rear substrate 22 side as shown in FIG. 5 (G). Thus, a white color is displayed.

In the present exemplary embodiment, application of a voltage specified for the respective particle groups 34 between the substrates causes selective movement of desired particles according to an electric field generated by the voltage. Thus, the movement of particles having colors other than the desired colors in the dispersion medium 50 may be suppressed, mixture of colors caused by intermingling of a color other than the desired color may be suppressed, and a color display may performed while suppressing deterioration of image quality of the display medium 12. As long as the absolute values of voltages required for moving the respective particle groups 34 according to an electric field are respectively different from each other, a clear color display is achieved even when the respective required voltage ranges for moving according to an electric field mutually overlap. When the voltage ranges are different from each other without overlap, a color display may be achieved while further suppressing intermingling of colors.

By dispersing the particle groups 34 having three colors of cyan, magenta, and yellow in the dispersion medium 50, cyan, magenta, yellow, blue, red, green, and black colors may be displayed; further, display of a particular color is achieved, for example by displaying a white color using white large-diameter colored particles 36.

Thus, also in the display device 10 according to the present exemplary embodiment, display is performed by movement and attachment of the particles 34 to the display substrate 20 or the rear substrate 22, as in the display device 10 described in the first exemplary embodiment above. Because the surfaces of the display substrate 20 and the rear substrate 22 that oppose each other have the treatment layers 21 and 23 of a polymer compound having a silicone chain, adhesion and fixing of the particles 34 may be suppressed due to the presence of the silicone chain even when the particles 34 move and attach to the opposing surfaces. As a result, color reproducibility and high contrast may be achieved.

Third Exemplary Embodiment

Figure 6:
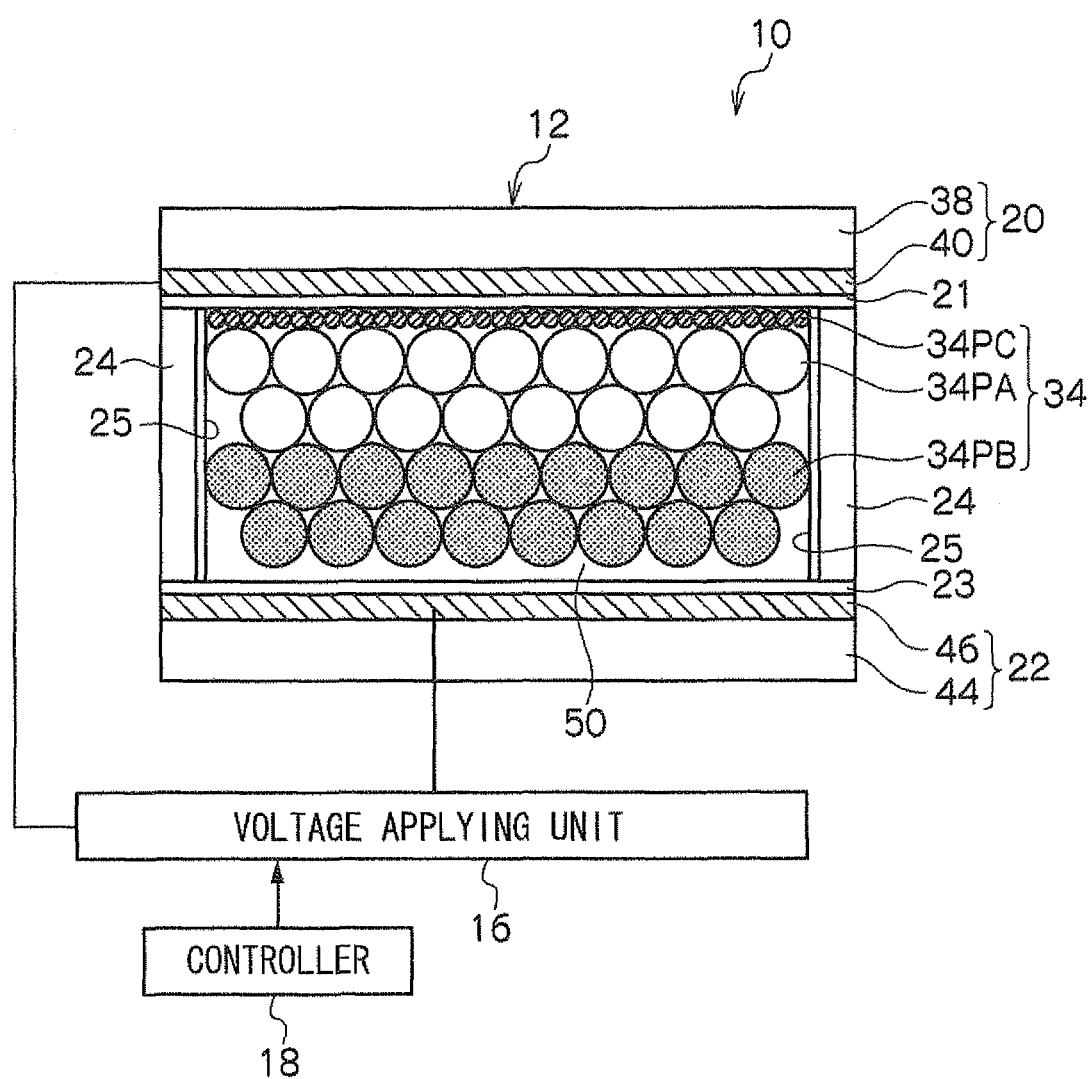
FIG. 6 is a schematic view of a display device according to a third exemplary embodiment of the present invention.

FIG. 6 is a schematic view of a display device according to a third exemplary embodiment of the present invention. FIG.

Figure 8:
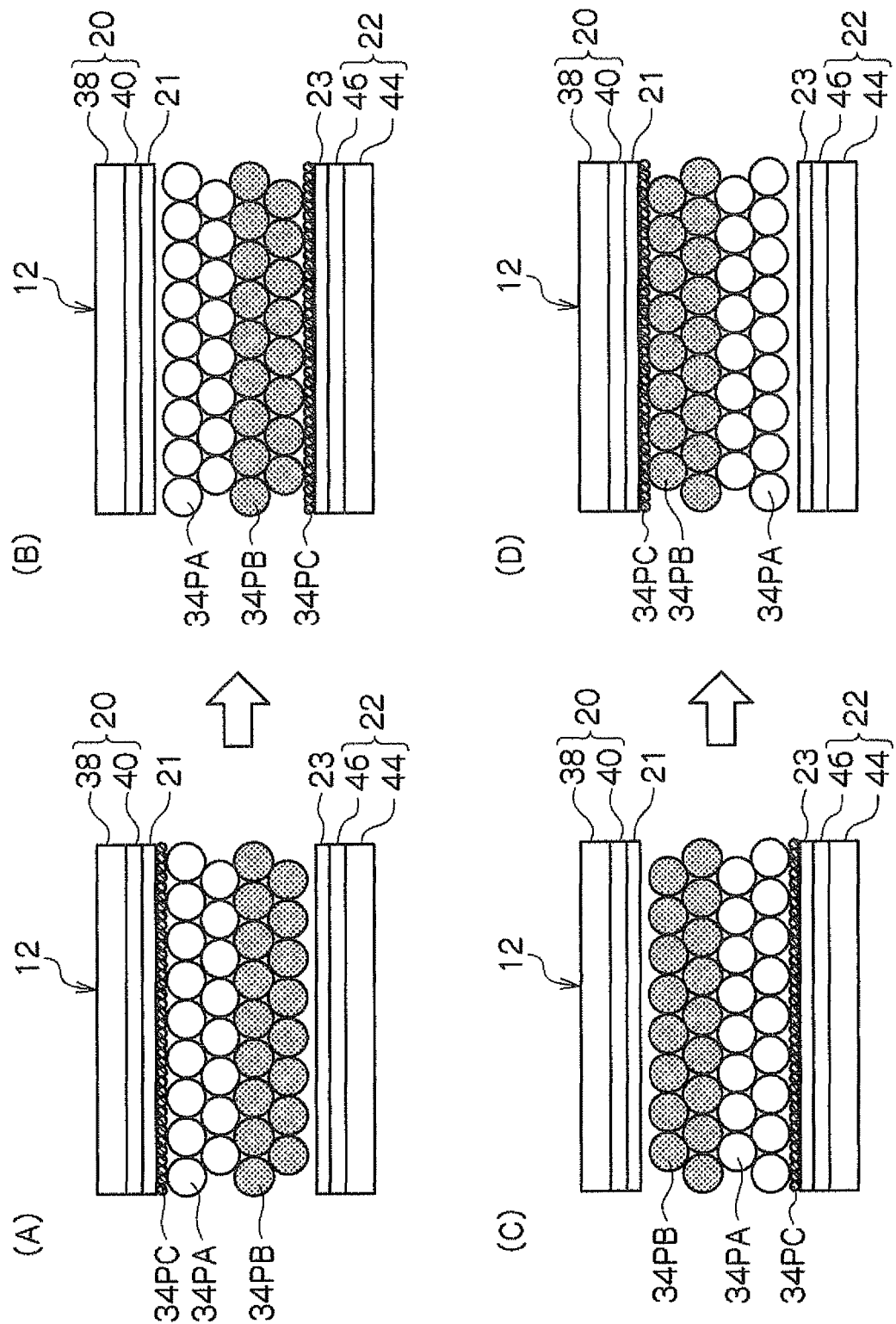
FIG. 8 is an illustration showing drive control of a display device according to the third exemplary embodiment, and showing transitions from one color display state to another.

7 is a diagram schematically showing a relationship between an applied voltage and a degree of movement of particles (display density) in the display device according to the third exemplary embodiment FIG. 8 is an illustration for drive control of a display device according to the third exemplary embodiment, showing transition from one color display state to another.

The display device 10 according to a third exemplary embodiment includes, as shown in FIG. 6, a display medium 12 that displays an image by way of movement (moving) of particle groups 34 (a first particle group 34PA, a second particle group 34PB, and a third particle group 34PC) and a controller 18 that receives image display instructions from an external image signal output device such as a personal computer and that regulates the operation of a voltage applying unit 16 based on image data stored in an image memory unit (not shown in the figure).

The display medium 12 includes a light-transmitting display substrate 20 serving as an image display surface and a rear substrate 22 that opposes to the display substrate 20 with a given space therebetween. Further, a spacing member 24 that partitions the space between the display substrate 20 and the rear substrate 22 into plural cells is also disposed.

On the surfaces of the display substrate 20 and the rear substrate 22 that oppose each other, treatment layers 21 and 23 of a polymer compound having a silicone chain are provided respectively. In addition, a treatment layer 25 of a polymer compound having a silicone chain is formed on a surface (a surface at the cell interior side) of the spacing member 24.

A dispersion medium 50 having light-transmitting property, for example, is enclosed between the display substrate 20 and the rear substrate 22. In the dispersion medium 50, three kinds of colored particle groups 34 (a first particle group 34PA, a second particle group 34PB, and a third particle group 34PC) are enclosed. Each particle group moves according to an electric field formed between the substrates.

The size (volume average diameter) of the particle of each of the first particle group 34PA and the second particle group 34PB may be such a size that the particle of the third particle group 34PC can move through the voids formed among the first particles 34PA and the second particles 34PB. Therefore, the size of the first particles 34PA and the size of the second particles 34PB are desirably at least 10 times the size of the third particles 34C. When the variation of the size is large within the respective particle group, the size of the first particles 34PA and the size of the second particles 34PB are desirably at least 20 times the size of the third particles 34C. Due to such a configuration, the third particles 34PC move smoothly among the gap among the first particles 34PA and the second particles 34PB without clogging the gap.

A decrease in the size of the third particles 34PC enables image display with higher resolution, but may decrease the moving speed and the display switching speed, and may make it difficult to achieve both display memory properties and dispersion stability. Therefore, the size of the third particles 34PC may be from 20 nm to 10 μm.

The amount of the first particles 34PA and the amount of the second particles 34PB may be such that the first particles 34PA form a single layer and the second particles 34PB form another single layer between the display substrate 20 and the rear substrate 22; however, the amount of the first particles 34PA and the amount of the second particles 34PB is preferably such that the particle of each particle group form plural layers between the display substrate 20 and the rear substrate 22 because a higher shielding effect may be attained. When the size of the first particles 34PA and the size of the second particles 34PB are increased, the distance between the substrates is increased, thereby causing increase in display drive voltage or decrease in display switching speed. Therefore, the size of the first particles 34PA and the size of the second particles 34PB are preferably 50 μm or less and more preferably 30 μm or less.

The first particle group 34PA and the second particle group 34PB are configured to move towards different substrates from each other when a voltage of a predetermined specific level is applied between the substrates for a predetermined specific time so as to expose the particles to an electric field. Although, the first particles 34PA are described to be negatively charged and the second particles 34PB are described to be positively charged in the present exemplary embodiment, the polarity (positive or negative) may be reversed. Further, when either one of the particle groups is charged, the other particle group may move toward the opposite substrate due to the movement of the charged particle group. Therefore, a configuration may be adopted in which only one of the particle groups is charged positively or negatively.

In order to secure the movement of the particles between the substrates and the display density, the total of the volume filling ratio of the first particles 34PA and the volume filling ratio of the second particles 34PB may be from 10% to 60%, and preferably from 30% to 50%, assuming that the space within the cell is 100%. When the first particles 34PA are aggregated and the second particles 34PB are aggregated (a state in which the particles of each particle group move to and gather at a substrate upon application of an electric field between the substrates), the third particles 34PC can move through the gap among particles of the first particle group 34PA and the gap among particles of the second particle group 34PB, as described above.

The respective particle groups 34 are colored in different colors from each other. In the present exemplary embodiment, the first particle group 34PA is colored in white, the second particle group 34PB is colored in black, and the third particle group 34PC is colored in red.

Figure 7:
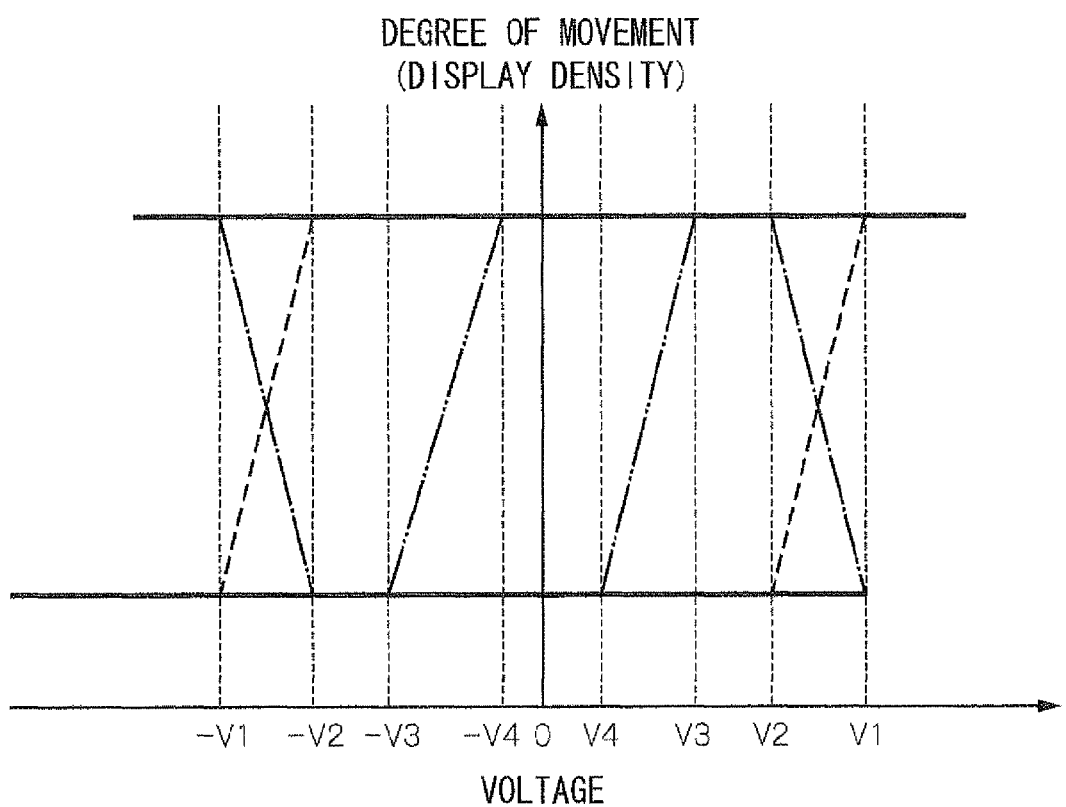
FIG. 7 is a diagram schematically showing a relationship between an applied voltage and a degree of movement of particles (display density) in the display device according to the third exemplary embodiment.

In the present exemplary embodiment, the respective particle groups 34 have different charging properties from each other. The voltage range required for moving each particle group 34 toward a desired substrate and displaying the color of the particle group is as shown in FIG. 7. FIG. 7 shows the display density characteristics due to the respective particle groups 34 when the rear electrode 46 is ground (0 V) and a desired pulse voltage is applied to the front electrode 40. For the measurement of the display density, a pulse voltage is applied between the display surface side and the rear surface side and is changed gradually in stepwise (the applied voltage is increased or decreased); the display density is measured as an optical density (OD) on the display surface side at each pulse voltage using a reflection density meter (X-Rite 404) manufactured by X-rite Corp. Regarding white color, although the optical density is actually decreased when white color particles has moved to the display substrate side, the density is shown to be higher in FIG. 7 when the white color particles have moved to the display substrate side.

In the present exemplary embodiment, by providing differences in the charge amount and particle diameter (volume average diameter) between the respective particle groups 34, adhesive force to the display substrate 20 (treatment layer) is varied between the particle groups 34 and/or adhesive force to another particle in the same particle group is varied between the particle groups 34, so that the voltage at which the movement of the particles starts is varied among the first particle group 34A, the second particle group 34B, and the third particle group 34C.

The display density characteristics of the respective particle groups 34 may be regulated by the difference in the adhesion force described above and/or by a difference in the mobility between the particle groups 34. Since at least the white particles among the first particle group 34PA and the second particle group 34PB are not transparent, the third particle group 34PC does not contribute to the display density until the third particle group 34PC moves to a position that is nearer to the display substrate than the white particles are to the display substrate side. Therefore, when the mobility of the third particle group 34PC is small, the third particle group moves only a little upon application of a low pulse voltage, and the third particle group does not contribute to the display density. When the voltage exceeds a certain value, the third group moves to a position that is nearer to the display substrate than the white particles are to the display substrate side, and the third particle group contributes to the display density and provides the display characteristics shown in FIG. 7. This also applies to the first particle group 34PA and the second particle group 34PB; therefore black particles do not contribute the display density until the black particles moves to a position that is nearer to the display substrate than the while particles are to the display substrate, so that the display characteristics shown in FIG. 7 is obtained.

In the present exemplary embodiment, the first particles 34PA are charged negatively, the second particles 34PB is charged positively, and the third particles 34PC is charged negatively. The voltage range required for moving the first particle group 34PA and the second particle group 34PB and displaying the colors of the respective particle groups is $|V2 \leqq V \leqq V1|$ (a voltage whose absolute value is between V2 and V1 (inclusive)). The voltage range required for moving the third particle group 34PC and displaying the color of the third particle group 34PC is $|V4 \leqq V \leqq V3|$ (a voltage whose absolute value is between V4 and V3 (inclusive)). Although the value $|V4|$ may be 0 V, V4 preferably satisfies $|V4|>0$ V in consideration of the display memory characteristics.

Next, an example of drive control of the display device 10 according to the present exemplary embodiment configured as described above is described. In the following description, it is assumed that the rear substrate 22 is grounded (0 V) and a voltage is applied to the front electrode 40, for the sake of simplifying the description.

First, when the voltage applying unit 16 applies a voltage V (V1) between the front electrode 40 and the rear electrode 46 according to the control by the controller 18, the negatively charged first particle group 34PA moves to the display substrate 20 side and the positively charged second particle group 34B moves to the rear substrate 22 side. The negatively charged third particle group 34PC moves to the display substrate 20 side through the gap among the first particles 34PA and the second particles 34PB. As a result, the display device gets into the state shown in FIG. 8(A), and red, which is the color of the third particles 34PC, is displayed.

When the voltage applying unit 16 applies a voltage V (−V3) between the front electrode 40 and the rear electrode 46 in the state shown FIG. 8(A) according to control by the controller 18, only the third particle group 34PC moves to the rear substrate 22 side. Thus, the display device gets into the state shown in FIG. 8(B), and white, which is the color of the first particles 34PA, is displayed.

When the voltage applying unit 16 applies a voltage V (−V1) between the front electrode 40 and the rear electrode 46 according to control by the controller 18, the negatively charged first particle group 34PA moves to the rear substrate 22 side and the positively charged second particle group 34B moves to the display substrate 20 side. Further, the negatively charged third particle group 34PC moves to the rear substrate 22 side through the gap among the first particles 34PA and the second particles 34PB. As a result, the display device gets into the state shown in FIG. 8(C), and black, which is the color of the second particles 34PB, is displayed.

In the present exemplary embodiment, among three kinds of particle groups, the first particle group 34PA and the second particle group 34PB have particle diameters larger than that of the other particle group (the third particle group 34PC); the third particle group 34PC has such a particle diameter that the third particles 34PC can move through the gap among the particles of two particle groups (the first particle group 34PA and the second particle group 34PB), whereby the voltage range required for the moving the third particle group is made different from the voltage ranges required for moving the first particle group and the second particle group. Accordingly, even when the third particles 34PC that contact with, or are positioned close to, the first particles 34PA and the second particles 34PB are driven to move, the first particles 34PA and the second particles 34PB may be not easily affected by the movement of the third particles 34PC owing to the mass difference therebetween. Further, by adjusting the volume filling ratio of the first particle group 34PA and the second particle group 34PB to a substantial value (from 30% to 60% in the present exemplary embodiment), the first particles 34PA and the second particles 34PB do not easily move owing to the friction between particles of the first particle group 34PA and the second particle group 34PB, so that the first particles 34PA and the second particles 34PB may be unaffected by the movement of the third particles 34PC.

Therefore, the first particles 34PA and the second particles 34PB, which are not easily moved and have voltage ranges required for the movement thereof at a higher voltage side than that of the third particles 34PC, are driven to move first, and then the third particles 34PC are driven to move, whereby color display may be attained while preventing intermingling of colors.

As long as at least one of the first particle group 34PA or the second particle group 34PB is charged, a desired one of the first particle group 34PA or the second particle group 34PB may be moved to the display substrate 20 side. In the present exemplary embodiment, since the first particle group 34PA and the second particle group 34PB are charged with the polarities opposite to each other, the movement of the desired particle group to the display substrate 20 side may be more ensured.

Thus, also in the display device 10 according to the present exemplary embodiment, because the surfaces of the display substrate 20 and the rear substrate 22 that oppose each other have the treatment layers 21 and 23 of a polymer compound having a silicone chain, adhesion and fixing of the particles 34 may be suppressed due to the presence of the silicone chain even when the particles 34 move and attach to the opposing surfaces. As a result, color reproducibility and high contrast may be achieved.

In the present exemplary embodiment, the first particle group 34PA is colored in white, the second particle group 34PB is colored in black, and the third particle group 34PC is colored in red. However, the combination of colors is not limited thereto, and particle groups colored in other colors may be used. For example, the first particle group 34PA may be colored in white, the second particle group 34PB may be colored in cyan, and the third particle group may be colored in red, with this combination, red color is displayed in the state of FIG. 8(A), white color is displayed in the state of FIG. 8(B), and cyan color is displayed in the state of FIG. 8(C).

Further, with this combination, when the voltage applying unit 16 applies a voltage V (−V4) between the front electrode 40 and the rear electrode 46 in the state of FIG. 8(C) according to control by the controller 18, only the third particle group 34PC moves to the display substrate 20 side to reach the state shown in FIG. 8(D); because the second particle group 34PB and the third particle group 34PC have complementary colors, black color is displayed. In this way, four colors of white, black, red, and cyan may be displayed. Furthermore, in this case, since black color is displayed by using the red color of the third particle group 34PC and the cyan color of the second particle group 34PB, the third particle group 34PC preferably has such a light-transmitting property as to allow the display of a secondary color.

In the present exemplary embodiment, an example is described above in which the voltage ranges in which the first particle group 34PA and the second particle group 34PB are moved for display is at a higher voltage side than the voltage range in which the third particle group 34PC is moved for display However, a configuration is also possible in which the voltage range for moving the third particle group 34PC for display is at a higher voltage side than the voltage ranges for moving the first particle group 34PA and the second particle group 34PB for display; in this configuration, the third particle group 34PC that has moved to a desired substrate in advance may be disturbed by the movement of the first particle group 34PA and the second particle group 34PB, which have larger particle diameters. Therefore, the voltage range for moving the first particle group 34PA and the second particle group 34PB for display is preferably at a higher voltage side than the voltage range for moving the third particle group 34PC for display.

Fourth Exemplary Embodiment

Figure 9:
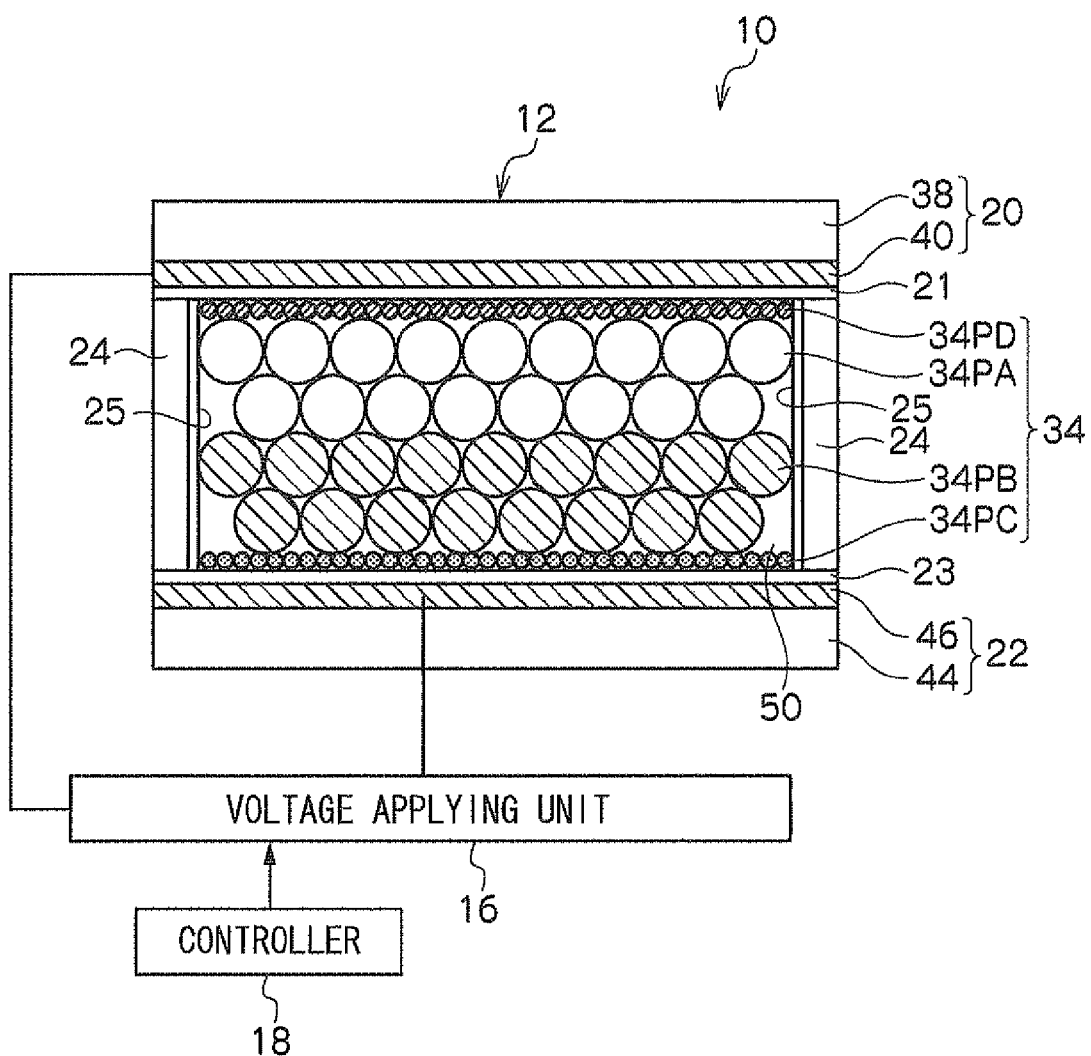
FIG. 9 is a schematic view of a display device according to a fourth exemplary embodiment of the present invention.
Figure 10:
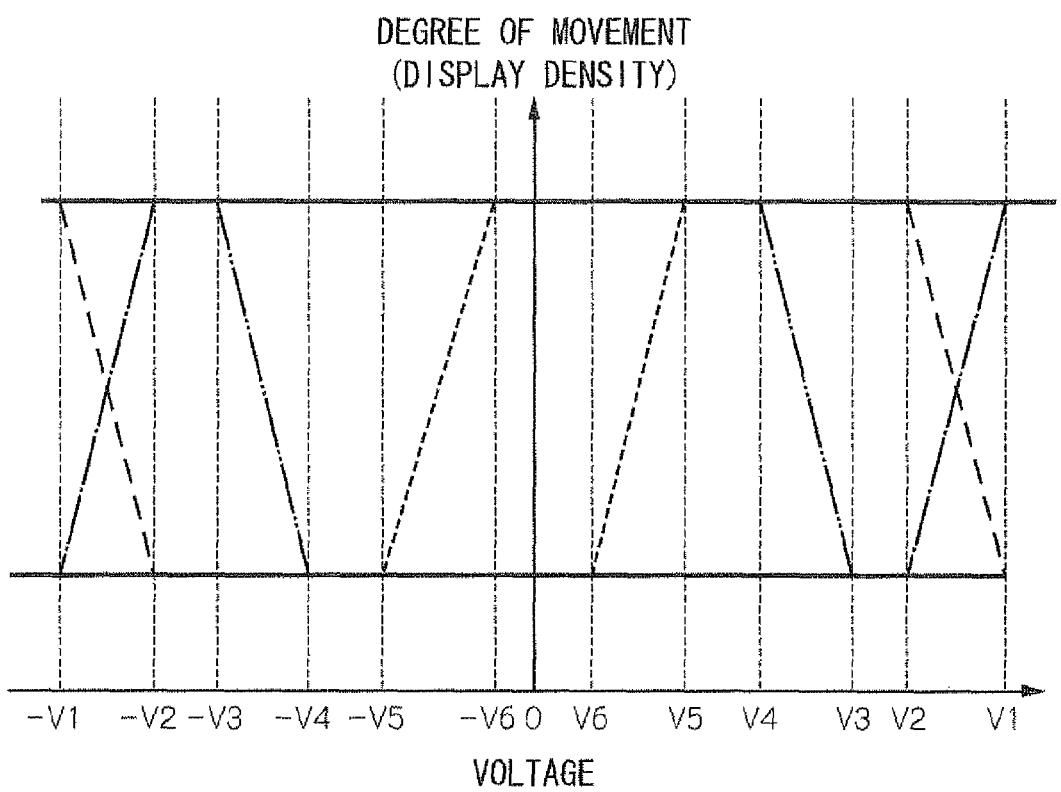
FIG. 10 is a diagram schematically showing a relationship between an applied voltage and a degree of movement of particles (display density) in a display device according to the fourth exemplary embodiment.
Figure 11:
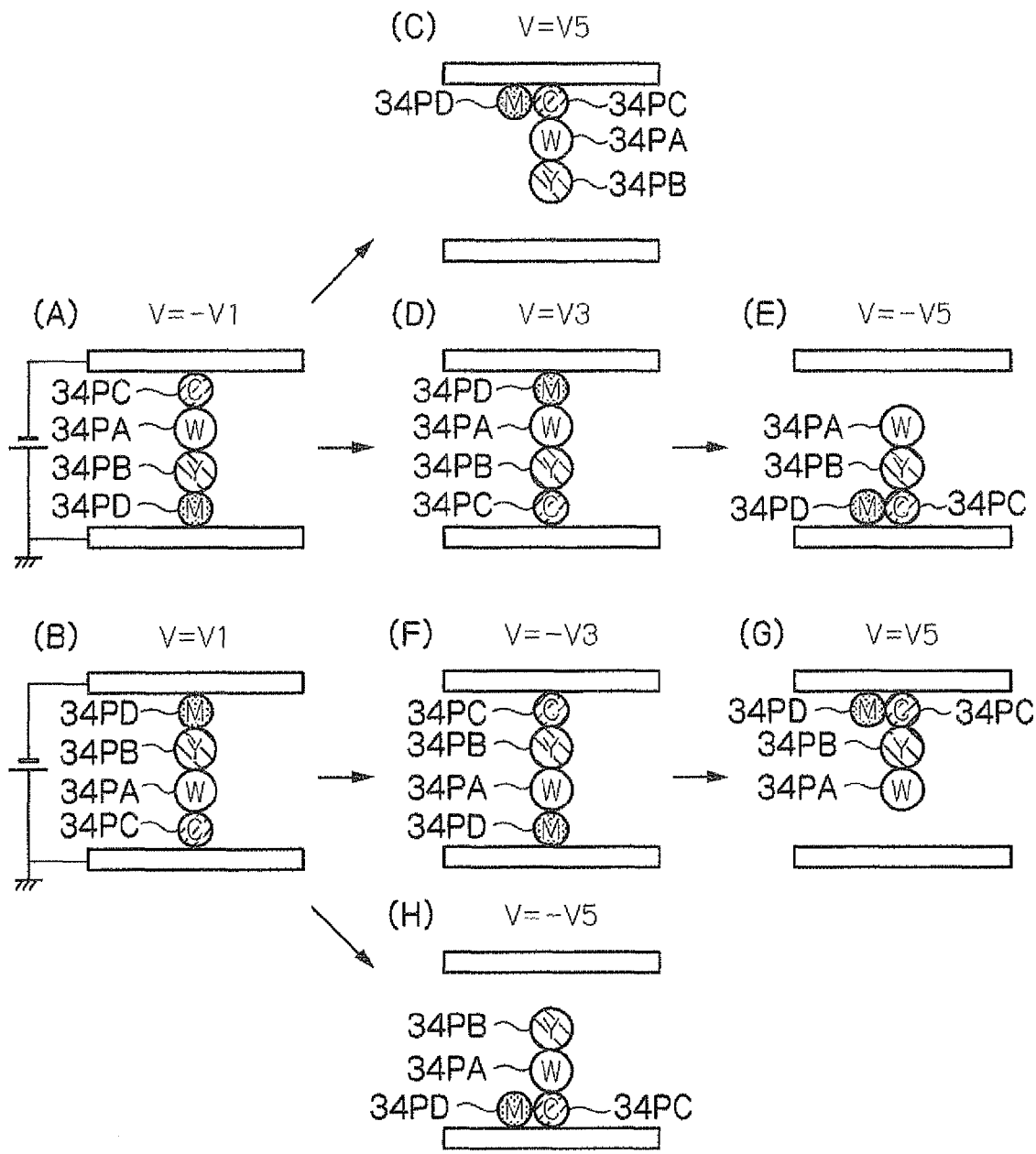
FIG. 11 is an illustration showing drive control of a display device according to the fourth exemplary embodiment, and showing transitions from one color display state to another.

FIG. 9 is a schematic view of a display device according to a fourth exemplary embodiment of the present invention. FIG. 10 is a diagram schematically showing a relationship between an applied voltage and a degree of movement of particles (display density) in a display device according to the fourth exemplary embodiment. FIG. 11 is an illustration for drive control of a display device according to the fourth exemplary embodiment, showing transition from one color display state to another.

The display device according to the fourth exemplary embodiment is described below. In the third exemplary embodiment, among three kinds of particle groups, two kinds of particle groups (the first particle group 34PA and the second particle group 34PB) have particle diameters larger than that of the other kind of particle group (the third particle group 34PC); the third particles 34PC have such a particle diameter that the third particles 34PC can move through the gap among the first particles 34PA and the second particles 34PB, whereby the voltage range required for the moving the third particle group is made different from the voltage ranges required for moving the first particle group and the second particle group. In the fourth exemplary embodiment, as shown in FIG. 9, the display device further contains a fourth particle group 34PD having a particle diameter smaller than those of the first particle group 34PA and the second particle group 34PB. In the following description, differences from the third exemplary embodiment are described.

In the present exemplary embodiment, the first particles 34PA are colored in white, the second particles 34PB are colored in yellow, the third particles 34PC are colored in cyan, and the fourth particles are colored in magenta. However, the combination of colors is not limited thereto, and particle groups colored in other colors may be used.

The fourth particles 34PD, which are additional particles not used in the third exemplary embodiment, are a group of particles having a particle diameter smaller than those of the first particle group 34PA and the second particle group 34PB. Similarly to the third particle group 34PC, the fourth particles 34PD may have such a particle diameter that the fourth particles 34PD can move through the gap among the first particles 34PA and the second particles 34PB. The particle diameter of the fourth particles 34PD may be the same or substantially the same as the particle diameter of the third particles 34PC, or may be different from the particle diameter of the third particles 34PC. The third particles 34PC and the fourth particles 34PD used herein have such light-transmitting properties as to allow the display of a secondary color.

In the present exemplary embodiment, the charging properties of the first to fourth particle groups 34PA to 34PD are different from one another. The voltage ranges required for moving the respective particle groups are shown in FIG. 10.

In the present exemplary embodiment, the first particle group 34PA is charged positively, the second particle group 34PB is charged negatively, the third particle group 34PC is charged positively, and the fourth particle group 34PD is charged negatively.

The voltage range required for moving the first particle group 34PA and the second particle group 34PB is $|V2 \leq V \leq V1|$ (a voltage whose absolute value is between V2 and V1 (inclusive)), the voltage range required for moving the third particle group 34PC is $|V4 \leq V \leq V3|$ (a voltage whose absolute value is between V4 and V3 (inclusive)), and the voltage range required for moving the fourth particle group 34PD is $|V6 \leq V \leq V5|$ (a voltage whose absolute value is between V6 and V5 (inclusive)).

The charge polarities of the respective particle groups are not limited to the above as long as the first particle group 34PA and the second particle group 34PB move in the directions opposite to each other. Although the third particle group 34PC and the fourth particle group 34PD are described to be charged with the polarities opposite to each other in the present exemplary embodiment, the third particle group 34PC and the fourth particle group 34PD may be charged with the same polarity when the voltage ranges required for moving the respective particle groups are different from each other, because the third particle group 34PC and the fourth particle group 34PD may be moved independently.

Next, an example of drive control of the display device according to the present exemplary embodiment configured as described above is described. In the following description, it is assumed that the rear substrate 22 is grounded (0 V) and a voltage is applied to the front electrode 40, for the sake of simplifying the description.

First, when the voltage applying unit 16 applies a voltage V (−V1) between the front electrode 40 and the rear electrode 46 according to the control by the controller 18, the first particle group 34PA moves to the display substrate 20 side and the second particle group 34B moves to the rear substrate 22 side. Further, the third particle group 34PC moves to the display substrate 20 side through the gap among the first particles 34PA and the second particles 34PB, and the fourth particle group 34PD moves to the rear substrate 22 side. As a result, the display device gets into the state shown in FIG. 11(A) and the third particles 34PC colored in cyan are observed from the display substrate 20 side; since the white colored first particle group 34PA is present beneath (i.e., at the rear substrate 22 side of) the third particle group 34PC having light-transmitting property, cyan color is displayed.

When the voltage applying unit 16 applies a voltage V (V5) between the front electrode 40 and the rear electrode 46 in the state shown by FIG. 11(A) (cyan color display state) according to the control by the controller 18, the fourth particle group 34PD moves to the display substrate 20 side. As a result, the display device gets into the state shown in FIG. 11(C) and the third particles 34PC colored in cyan and the fourth particles 34PD colored in magenta are observed from the display substrate 20 side; since the white colored first particle group 34PA is present beneath (i.e., at the rear substrate 22 side of) the third particle group 34PC and the fourth particle group 34PD that have light-transmitting properties, blue color, which is a subtractive color mixture of cyan and magenta, is displayed.

When the voltage applying unit 16 applies a voltage V (V3) between the front electrode 40 and the rear electrode 46 in the state shown in FIG. 11(A) (cyan color display state) according to the control by the controller 18, the third particle group 34PC moves to the rear substrate 22 side and the fourth particle group 34PD moves to the display substrate 20 side. As a result, the display device gets into the state shown by (D) in FIG. 11 and the fourth particles 34PD colored in magenta are observed from the display substrate 20 side; since the white colored first particle group 34PA is present beneath (i.e., at the rear substrate 22 side of) the fourth particle group 34PD that has light-transmitting property, magenta color is displayed.

When the voltage applying unit 16 applies a voltage V (−V5) between the font electrode 40 and the rear electrode 46 in the state shown in FIG. 11(D) (magenta color display state) according to the control by the controller 18, the fourth particle group 34PD moves to the rear substrate 22 side. As a result, the display device gets into the state shown in FIG. 11(E) and the white colored first particles 34PA are observed from the display substrate 20 side, and white color is displayed.

When the voltage applying unit 16 applies a voltage V (V1) between the front electrode 40 and the rear electrode 46 according to the control by the controller 18, the first particle group 34PA moves to the rear substrate 22 side and the second particle group 34PB moves to the display substrate 20 side. Further, through the gap among the first particles 34PA and the second particles 34PB, the third particle group 34PC moves to the rear substrate 22 side and the fourth particle group 34PD moves to the display substrate 20 side. As a result, the display device gets into the state shown in FIG. 11(B) and the fourth particles 34PD colored in magenta are observed from the display substrate 20 side; since the yellow colored second particles 34PB is present beneath (i.e., at the rear substrate 22 side of) the fourth particle group 34PD that has light-transmitting property, red color, which is a subtractive color mixture of magenta and yellow, is displayed.

When the voltage applying unit 16 applies a voltage V (−V3) between the front electrode 40 and the rear electrode 46 in the state shown in FIG. 11(B) (red color display state) according to the control by the controller 18, the third particle group 34PC moves to the display substrate 20 side and the fourth particle group 34PD moves to the rear substrate 22 side. As a result, the display device gets into the state shown in FIG. 11(F) and the third particles 34PC colored in cyan are observed from the display substrate 20 side; since the yellow colored second particle group 34PB is present beneath (i.e., at the rear substrate 22 side of) the third particle group 34PC that has light-transmitting property, green color, which is a subtractive color mixture of cyan and yellow, is displayed.

When the voltage applying unit 16 applies a voltage V (V5) between the front electrode 40 and the rear electrode 46 in the state shown in FIG. 11(F) (green color display state) according to the control by the controller 18, the fourth particle group 34PD moves to the display substrate 20 side. As a result, the display device gets into the state shown in FIG. 11(G) and the third particles 34PC colored in cyan and the fourth particles 34PD colored in magenta are observed from the display substrate 20 side; since the yellow colored second particle group 34PB is present beneath (i.e., at the rear substrate 22 side of) the third particle group 34PC and the fourth particle group 34PD that have light-transmitting property, black color, which is a subtractive color mixture of cyan, magenta, and yellow, is displayed.

When the voltage applying unit 16 applies a voltage V (−V5) between the front electrode 40 and the rear electrode 46 in the state shown in FIG. 11(B) (red color display state) according to the control by the controller 18, the fourth particle group 34PD moves to the rear substrate 22 side. As a result, the display device gets into the state shown in FIG. 11(H) and the second particles 34PB colored in yellow are observed from the display substrate 20 side, and yellow color is displayed.

As described above, when the display device additionally includes the fourth particle group 34PB that is not used in the third exemplary embodiment, the third particles 34PC and the fourth particles 34PD that contact with, or are positioned close to, the first particles 34PA and the second particles 34PB are driven to move, the first particles 34PA and the second particles 34PB are not easily affected by the movement of the third particles 34PC and the fourth particles 34PD owing to the mass difference therebetween. Further, by adjusting the volume filling ratio of the first particle group 34PA and the second particle group 34PB to a substantial value (from 30% to 60% in the present exemplary embodiment), the first particles 34PA and the second particles 34PB do not easily move owing to the friction between particles of the first particle group 34PA and the second particle group 34PB, so that the first particles 34PA and the second particles 34PB may be unaffected by the movement of the third particles 34PC and the fourth particles 34PD.

Therefore, the first particles 34PA and the second particles 34PB, which are not easily moved and have voltage ranges required for the movement thereof at a higher voltage side than those of the third particles 34PC and the fourth particles 34PD, are driven to move first, and then the third particles 34PC and the fourth particles 34PD are driven to move, whereby color display may be attained while preventing intermingling of colors In the present exemplary embodiment, the particle groups are colored in white, yellow, cyan, and magenta, respectively, whereby eight colors may be displayed.

As long as at least one of the first particle group 34PA or the second particle group 34PB is charged, a desired one of the first particle group 34PA or the second particle group 34PB may be moved to the display substrate 20 side. In the present exemplary embodiment, since the first particle group 34PA and the second particle group 34PB are charged with the polarities opposite to each other, the movement of the desired particle group to the display substrate 20 side may be more ensured.

The third particle group 34PC and the fourth particle group 34PD may be moved independently from each other, as long as the voltage ranges required for moving the respective particle groups are different from each other. In the present exemplary embodiment, since the third particle group 34PC and the fourth particle group 34PD are charged with the polarities opposite to each other, movement of the particle groups may be realized while more effectively suppressing intermingling of colors than a case in which the particle groups are charged with the same polarity.

As described above, also in the display device 10 according to the present exemplary embodiment, because the surfaces of the display substrate 20 and the rear substrate 22 that oppose each other have the treatment layers 21 and 23 of a polymer compound having a silicone chain, adhesion and fixing of the particles 34 may be suppressed due to the presence of the silicone chain even when the particles 34 move and attach to the opposing surfaces. As a result, color reproducibility and high contrast may be achieved.

In the third and fourth exemplary embodiments, the particle diameter of the first particle group 34PA and the particle diameter of the second particle group 34PB may be the same as each other or different from each other.

In the third and fourth exemplary embodiments, the volume filling ratio of the first particle group 34PA and the second particle group 34PB is assumed to be from 30% to 60%. The volume filling ratio of the first particle group 34PA and the volume filling ratio of the second particle group 34PB are not necessarily the same, and may be different from each other. For example, when the volume filling ratio of the first particle group 34PA colored in white is higher than that of the second particle group 34PB, the degree of whiteness at the time of white color display may be enhanced.

In each of the third and fourth exemplary embodiments, although a particular description on gradation of the displayed color is not given above, each color may be displayed with gradation by controlling the time and voltage level upon application of the voltage.

In the third and fourth exemplary embodiments, a case in which the first particle group 34PA and the second particle group 34PB are charged in polarities opposite to each other is described; however, the configuration is not limited thereto. As described in the first exemplary embodiment, even when only one of the particle groups is charged, the other particle group may move toward the opposite substrate due to the movement of the charged particle group. Therefore, a configuration may be adopted in which only one of the particle groups is charged positively or negatively.

EXAMPLES

Hereinafter, the present invention will be described in more detail with reference to examples. However, the present invention is not limited to the following examples.

Preparation of Large-Diameter Colored Particle Group (White Color Particle Group)
Preparation of Dispersion Liquid A:

The following components are mixed, and then pulverized in a ball mill with zirconia balls having a diameter of 10 mm for 20 hours to obtain a dispersion liquid A.
<Composition>

| | |
|---|---|
| Cyclohexyl methacrylate: | 53 parts by weight |
| Titanium oxide 1 (white pigment) (having a primary particle diameter of 0.3 μm; TIPAQUE CR63, manufactured by ISHIHARA SANGYO KAISHA LTD.): | 45 parts by weight |
| Cyclohexane: | 5 parts by weight. |

Preparation of Calcium Carbonate Dispersion Liquid B:
The following components are mixed, and then, similarly to the above, finely pulverized with a ball mill, whereby a calcium carbonate dispersion liquid B is obtained.
<Composition>

| | |
|---|---|
| Calcium carbonate: | 40 parts by weight |
| Water: | 60 parts by weight. |

Preparation of Mixed Liquid C:
The following components are mixed, deaerated with an ultrasonicator for 10 minutes, and then agitated with an emulsifier, whereby a mixed liquid C is obtained.
<Composition>

| | |
|---|---|
| 2% by weight CELOGEN aqueous solution (manufactured by DAI-ICHI KYOGYO SEIYAKU CO., LTD.): | 4.3 g |
| Calcium carbonate dispersion liquid B: | 8.5 g |
| 20% by weight saline water: | 50 g. |

The dispersion liquid A in an amount of 35 g and divinylbenzene in an amount of 1 g, and AIBN (azobisisobutyronitrile) in an amount of 0.35 g as a polymerization initiator are weighed and sufficiently mixed and deaerated with an ultrasonicator for 10 minutes. The resultant mixture is added to the mixed liquid C, and then emulsified with an emulsifier. The resultant emulsion is put in a bottle, which is then plugged with a silicone stopper and deaerated under vacuum sufficiently using a syringe needle. Nitrogen gas is injected into the bottle and the bottle is sealed. Thereafter, the emulsion is allowed to react for 15 hours at 65° C., whereby particles are obtained. After cooling, the resultant emulsion is processed with a freeze drier at −35° C. under a pressure of 0.1 Pa for 2 days so as to remove cyclohexane. The resultant particle powder is dispersed in ion-exchange water, and aqueous hydrochloric acid solution is added thereto to decompose calcium carbonate, followed by filtration. Then, the particles are washed with sufficient amount of distilled water and sieved with nylon meshes with apertures of 20 μm and 25 μm respectively so as to uniformize the particle size. The resultant particles are dried, whereby white color particles having a volume average particle diameter of 20 μm are obtained. The obtained particles are used as large-diameter colored particles (white color particle group).

Preparation of Magenta Particle Group
Preparation of Dispersion Liquid A:
The following components are mixed, and then pulverized in a ball mill with zirconia balls having a diameter of 10 mm for 20 hours, whereby a dispersion liquid A is obtained.
<Composition>

| | |
|---|---|
| Cyclohexyl methacrylate: | 53 parts by weight |
| Magenta pigment (CARMINE 6B, manufactured by Dainichiseika Color & Chemicals Mfg. Co., Ltd.): | 3 parts by weight |
| Charge control agent (COPY CHARGE NY VP2351, manufactured by Clariant in Japan): | 2 parts by weight |
| Cyclohexane: | 5 parts by weight. |

Preparation of Calcium Carbonate Dispersion Liquid B:
The following components are mixed, and then, similarly to the above, finely pulverized with a ball mill, whereby a calcium carbonate dispersion liquid B is obtained.

<Composition>

| Calcium carbonate: | 40 parts by weight |
|---|---|
| Water: | 60 parts by weight. |

Preparation of Mixed Liquid C:

The following components are mixed, deaerated with an ultrasonicator for 10 minutes, and then agitated with an emulsifier to obtain a mixed liquid C.

<Composition>

| 2% by weight CELOGEN aqueous solution (manufactured by DAI-ICHI KYOGYO SEIYAKU CO., LTD.): | 4.3 g, |
|---|---|
| Calcium carbonate dispersion liquid B: | 8.5 g |
| 20% by weight saline water: | 50 g. |

The dispersion liquid A in an amount of 35 g and divinylbenzene in an amount of 1 g, and AIBN (azobisisobutylonitrile) in an amount of 0.35 g as a polymerization initiator are weighed and sufficiently mixed, and deaerated with an ultrasonicator for 10 minutes. The resultant mixture is added to the mixed liquid C, and then emulsified with an emulsifier. The resultant emulsion is put in a bottle, which is then plugged with a silicone stopper and deaerated under vacuum sufficiently using a syringe needle. Nitrogen gas is injected into the bottle and the bottle is sealed. Thereafter, the emulsion is allowed to react for 10 hours at 60° C., whereby particles are obtained. After cooling, the resultant emulsion is processed with a freeze drier at −35° C. under a pressure of 0.1 Pa for 2 days so as to remove cyclohexane. The resultant particle powder is dispersed in ion-exchange water, and aqueous hydrochloric acid solution is added thereto to decompose calcium carbonate, followed by filtration. Then, the particles are washed with sufficient amount of distilled water and dried. The resultant particles in an amount of 2 parts by weight and polyoxyethylene alkyl ether in an amount of 2 parts by weight as a nonionic surfactant are added to 98 parts by weight of dimethylsilicone oil (KF-96L-1cs, manufactured by Shin-Etsu Silicone Corp.). Then, the mixture is dispersed by agitation, whereby a dispersion liquid of magenta particles is obtained. The particles of the magenta particle group have a volume average particle diameter of 1 µm.

The charge polarity of the magenta particles in the dispersion liquid is evaluated by the moving direction thereof when the dispersion liquid is enclosed between two electrode plates and a DC voltage is applied. As a result, the magenta particles are found to be negatively charged.

Preparation of Cyan Particle Group

A silicone monomer of SILAPLANE FM-0711 (having a weight average molecular weight of 1,000 manufactured by CHISSO CORP) in an amount of 95 parts by weight, methyl methacrylate in an amount of 3 parts by weight, and glycidyl methacrylate in an amount of 2 parts by weight are mixed with 50 parts by weight of dimethylsilicone oil (KF-96L-1cs, manufactured by Shin-Etsu Silicone Co. Ltd.). To the mixture, 0.5 part by weight of azobisvaleronitrile as a polymerization initiator is added and polymerization is performed, whereby a reactive silicone polymer compound (reactive dispersant) having an epoxy group is obtained. The weight average molecular weight of the reactive silicone polymer compound is 600,000. Then, a silicone oil solution containing 3% by weight of the reactive silicone polymer compound (reactive dispersant) is prepared.

A copolymer of N-vinylpyrrolidone and N,N-diethylaminoethyl acrylate in a weight ratio of 9/1 (having a weight average molecular weight of 60,000) as a polymer having a chargeable group is synthesized by common radial solution polymerization.

Then, 3 parts by weight of a 10% aqueous solution of the copolymer is mixed with 1 part by weight of a water dispersion of a pigment manufactured by Ciba Corp. (UNISPERSE, cyan color, pigment concentration=26% by weight). The resultant mixed solution is mixed with 10 parts by weight of a silicone solution containing 3% by weight of the above reactive silicone polymer compound (reactive dispersant). Then, the mixture is agitated for 10 minutes with an ultrasonic pulverizer, whereby a suspension liquid is obtained in which an aqueous solution containing the pigment and the polymer having a chargeable group is dispersed and emulsified in dimethylsilicone oil (KF-96L-1cs, manufactured by Shin-Etsu Silicone Corp.).

Thereafter, water is removed from the suspension liquid under reduced pressure (2 KPa) and heating (70° C.), so that a silicone oil dispersion liquid is obtained in which the polymer compound having a chargeable group and colored particles containing the pigment are dispersed in dimethylsilicone oil (KF-96L-1cs, manufactured by Shin-Etsu Silicone Corp.). The dispersion liquid is then heated at 100° C. for 3 hours, whereby the reactive silicone polymer compound (reactive dispersant) reacts with and binds to the colored particles. Then, butyl bromide in an amount corresponding to 50 mol % of the N,N-diethylaminoethyl acrylate contained in the solid content of the particles is added to the dispersion liquid, which is then heated at 80° C. for 3 hours for the quaternalization of amino groups. Then, the particles are subjected to sedimentation with an ultracentrifugal separator, and purified by repeating washing and sedimentation with dimethylsilicone oil (KF-96L-1cs, manufactured by Shin-Etsu Silicone Corp.). In this way, a dispersion liquid containing cyan particles in a particle solid content of 5% by weight is prepared. The binding amount of the reactive silicone polymer compound (reactive dispersant) is analyzed by elemental analysis, and is found to be 20% by weight with respect to the weight of the particles. The volume average diameter of the particles of the cyan particle group is measured with a HORIBA LA-300 (Laser scattering and diffraction particle size distribution analyzer, manufactured by Horiba, Ltd) and found to be 380 nm.

The charge polarity of the cyan particles in the dispersion liquid is evaluated by the moving direction thereof when the dispersion liquid is enclosed between two electrode plates and a DC voltage is applied. As a result, the cyan particles are found to be positively charged.

Example A

Example A1

Preparation of Reactive Silicone Polymer Compound

SILAPLANE FM-0711 (having a weight average molecular weight Mw of 1,000, manufactured by CHISSO CORP) in an amount of 95 parts by weight as a silicone chain component (monomer) and glycidyl methacrylate in an amount of 5 parts by weight as a reactive component (monomer) are mixed with 100 parts by weight of dimethylsilicone oil (KF-96L-1cs, manufactured by Shin-Etsu Silicone Corp.). To the mixture, 0.5 part by weight of azobisvaleronitrile (V-65, Wako Pure Chemicals Industries, Ltd.) as a polymerization initiator is added and polymerization is performed at 55° C.

for 10 hours, whereby a reactive silicone polymer compound having an epoxy group is obtained. The weight average molecular weight of the reactive silicone polymer compound is 100,000. Then, the polymer compound is diluted with dimethylsilicone oil (KF-96L-1cs, manufactured by Shin-Etsu Silicone Corp.), whereby a silicone oil solution containing 3% by weight of the reactive silicone polymer compound is obtained.

Preparation of Display Medium

A display medium having a configuration similar to that of the first exemplary embodiment is prepared as follows (see FIG. 1).

ITO serving as an electrode is deposited to a thickness of 50 nm on a 0.7 mm-thick glass substrate by sputtering. The electrode surface of the substrate (a rear substrate) composed of the ITO and the glass substrate is immersed in an aqueous solution containing 2% by weight of γ-aminopropyl triethoxysilane for 15 minutes, rinsed with pure water, and then dried at 120° C. for 30 minutes. Thereafter, a thin film is prepared by spin-coating the above silicone oil solution containing 3% by weight of the reactive silicone polymer compound, then this is heated at 120° C. for 60 minutes. In this way, a treatment layer is formed. The treatment layer has a thickness of 100 nm and is insoluble in the following organic solvents: dimethylsilicone oil (KF-96L-1cs, manufactured by Shin-Etsu Silicone Corp.), acetone, tetrahydrofuran (THF), and isopropyl alcohol (IPA). The thickness of the treatment layer is measured with a step profiler DEKTAK 6M (manufactured by Veeco Instruments Inc.).

Then, a photosensitive polyimide varnish (PROBIMIDE 7005, manufactured by Fuji-Hunt Electronics Technology Co., Ltd.) is coated thereon to form a layer. By conducting exposure to light and wet etching, a spacing member having a height of 100 μm and a width of 20 μm is formed. A treatment layer is formed also on a surface (a surface at the cell interior side) of these spacing members in a manner similar to the formation of a treatment layer on the rear substrate.

A heat fusible adhesive layer (not shown in the figure) is formed on the upper portion of the spacing member, then the large-diameter colored particles (white particle group) and a dispersion liquid of the magenta particles are filled thereinto. A display substrate composed of ITO and a glass substrate prepared in a manner similar to the preparation of the rear substrate and having a treatment layer thereon is attached to the rear substrate such that the surfaces (electrode surfaces) of the substrates having the treatment layers thereon oppose each other, and then the resultant assembly is heated, whereby a display medium is obtained.

In this way, a display medium is prepared. A voltage of 50 V is applied between the electrodes of the prepared display medium, such that the electrode of the display substrate becomes electrically positive while the electrode of the rear substrate becomes electrically negative. The negatively charged magenta particles are observed to move to the display substrate by an action of an electric field formed by the applied voltage, and the display medium displays magenta color Then, a voltage of 50 V is applied between the electrodes such that the electrode of the display substrate becomes electrically negative and the electrode of the rear substrate becomes electrically positive. The negatively charged magenta particles are observed to move to the rear substrate by an action of an electric field formed by the applied voltage, and the display medium displays white color.

Thereafter, the display medium is disassembled and the surfaces (the surfaces that form the cells) of the display substrate and the spacing member are observed with an optical microscope. Adhesion and fixing of particles to the surfaces is not observed.

Example A2

Preparation of Reactive Silicone Polymer Compound

A silicone oil solution containing 3% by weight of a reactive silicone polymer compound is prepared in the same manner as in Example A1.

Preparation of Display Medium

A display medium having a configuration similar to that of the first exemplary embodiment is prepared as follows (see FIG. 1).

ITO serving as an electrode is deposited to a thickness of 50 nm on a 0.7 mm-thick glass substrate by sputtering. The electrode surface of the substrate (a rear substrate) composed of the ITO and the glass substrate is immersed in an aqueous solution containing 2% by weight of γ-aminopropyl triethoxysilane for 15 minutes, rinsed with pure water, and then dried at 120° C. for 30 minutes. Thereafter, a thin film is prepared by spin-coating the above silicone oil solution containing 3% by weight of the reactive silicone polymer compound, then this is heated at 120° C. for 60 minutes. In this way, a treatment layer is formed. The treatment layer has a thickness of 100 nm and is insoluble in the following organic solvents: dimethylsilicone oil (KF-96L-1cs, manufactured by Shin-Etsu Silicone Corp.), acetone, tetrahydrofuran (THF), and isopropyl alcohol (IPA). The thickness of the treatment layer is measured with a step profiler DEKTAK 6M (manufactured by Veeco Instruments Inc.).

Then, a photosensitive polyimide varnish (PROBIMIDE 7005, manufactured by Fuji-Hunt Electronics Technology Co., Ltd.) is coated thereon to form a layer. By conducting exposure to light and wet etching, a spacing member having a height of 100 μm and a width of 20 μm is formed. A treatment layer is formed also on a surface (a surface at the cell interior side) of these spacing members in a manner similar to the formation of a treatment layer on the rear substrate.

A heat fusible adhesive layer (not shown in the figure) is formed on the upper portion of the spacing member, then the large-diameter colored particles (white particle group) and a dispersion liquid of the cyan particles are filled thereinto. A display substrate composed of ITO and a glass substrate prepared in a manner similar to the preparation of the rear substrate and having a treatment layer thereon is attached to the rear substrate such that the surfaces (electrode surfaces) of the substrates having the treatment layers thereon oppose each other, and then the resultant assembly is heated, whereby a display medium is obtained.

A voltage of 50 V is applied between both electrodes of the prepared display medium, such that the electrode of the display substrate becomes electrically negative while the electrode of the rear substrate becomes electrically positive. The positively charged cyan particles are observed to move to the display substrate by an action of an electric field formed by the applied voltage, and the display medium displays cyan color.

Then, a voltage of 50 V is applied between both electrodes such that the electrode of the display substrate becomes electrically positive while the electrode of the rear substrate becomes electrically negative. The positively charged cyan particles are observed to move to the rear substrate by an action of an electric field formed by the applied voltage, and the display medium displays white color.

Thereafter, the display medium is disassembled and the surfaces (surfaces that form the cells) of the display substrate and the spacing member are observed with an optical microscope. Adhesion and fixing of particles to the surfaces is not observed.

Example A3

Preparation of Reactive Silicone Polymer Compound

SIAPLANE FM-0721 (having a weight average molecular weight Mw of 5,000, manufactured by CHISSO CORP) in an amount of 95 pans by weight as a silicone chain component (monomer) and glycidyl methacrylate in an amount of 5 parts by weight as a reactive component (monomer) are mixed with 100 parts by weight of dimethylsilicone oil (KF-96L-1cs, manufactured by Shin-Etsu Silicone Corp.). To the mixture, 0.5 part by weight of azobisvaleronitrile (V-65, Wako Pure Chemicals Industries, Ltd.) as a polymerization initiator is added and polymerization is performed at 55° C. for 10 hours, whereby a reactive silicone polymer compound having an epoxy group is obtained. The weight average molecular weight of the reactive silicone polymer compound is 100,000. Then, the polymer compound is diluted with dimethylsilicone oil (KF-96L-1cs, manufactured by Shin-Etsu Silicone Corp.), whereby a silicone oil solution containing 3% by weight of the reactive silicone polymer compound is obtained.

Preparation of Display Medium

A display medium is prepared in the same manner as in Example A1, except that each treatment layer is formed by using the above silicone oil solution containing 3% by weight of the reactive silicone polymer compound. The treatment layer prepared from the reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example A1. Thereafter, the display medium is disassembled. The surfaces (surfaces that form the cells) of the display substrate and the spacing member are observed with an optical microscope. Adhesion and fixing of particles to the surfaces is not observed.

Example A4

Preparation of Reactive Silicone Polymer Compound

SILAPLANE FM-0725 (having a weight average molecular weight Mw of 10,000; manufactured by CHISSO CORP) in an amount of 95 parts by weight as a silicone chain component (monomer) and glycidyl methacrylate in an amount of 5 parts by weight as a reactive component (monomer) are mixed with 100 parts by weight of dimethylsilicone oil (KF-96L-1cs, manufactured by Shin-Etsu Silicone Corp.). To the mixture, 0.5 part by weight of azobisvaleronitrile (V-65, Wako Pure Chemicals Industries, Ltd.) as a polymerization initiator is added and polymerization is performed at 55° C. for 10 hours, whereby a reactive silicone polymer compound having an epoxy group is obtained. The weight average molecular weight of the reactive silicone polymer compound is 100,000. Then, the polymer compound is diluted with dimethylsilicone oil (KF-96L-1cs, manufactured by Shin-Etsu Silicone Corp.), whereby a silicone oil solution containing 3% by weight of the reactive silicone polymer compound is obtained.

Preparation of Display Medium

A display medium is prepared in the same manner as in Example A1, except that each treatment layer is formed by using the above silicone oil solution containing 3% by weight of the reactive silicone polymer compound. The treatment layer prepared from the reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example A1. Thereafter, the display medium is disassembled. The surfaces (surfaces that form the cells) of the display substrate and the spacing member are observed with an optical microscope. Adhesion and fixing of particles to the surfaces is not observed.

Example A5

Preparation of Reactive Silicone Polymer Compound

SILAPLANE FM-0711 (having a weight average molecular weight Mw of 1,000; manufactured by CHISSO CORP) in an amount of 80 parts by weight as a silicone chain component (monomer) and glycidyl methacrylate in an amount of 20 parts by weight as a reactive component (monomer) are mixed with 100 parts by weight of dimethylsilicone oil (KF-96L-1cs, manufactured by Shin-Etsu Silicone Corp.). To the mixture, 0.5 part by weight of azobisvaleronitrile (V-65, Wako Pure Chemicals Industries, Ltd.) as a polymerization initiator is added and polymerization is performed at 55° C. for 10 hours, whereby a reactive silicone polymer compound having an epoxy group is obtained. The weight average molecular weight of the reactive silicone polymer compound is 100,000. Then, the polymer compound is diluted with dimethylsilicone oil (KF-96L-1cs, manufactured by Shin-Etsu Silicone Corp.), whereby a silicone oil solution containing 3% by weight of the reactive silicone polymer compound is obtained.

Preparation of Display Medium

A display medium is prepared in the same manner as in Example A1, except that each treatment layer is formed by using the above silicone oil solution containing 3% by weight of the reactive silicone polymer compound. The treatment layer prepared from the reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example A1. Thereafter, the display medium is disassembled. The surfaces (surfaces that form the cells) of the display substrate and the spacing member are observed with an optical microscope. Adhesion and fixing of particles to the surfaces is not observed.

Example A6

Preparation of Reactive Silicone Polymer Compound

SILAPLANE FM-0711 (having a weight average molecular weight Mw of 1,000; manufactured by CHISSO CORP) in an amount of 70 parts by weight as a silicone chain component (monomer) and glycidyl methacrylate in an amount of 30 parts by weight are mixed with 100 parts by weight of dimethylsilicone oil (KF-96L-1cs, manufactured by Shin-Etsu Silicone Corp.). To the mixture, 0.5 part by weight of azobisvaleronitrile (V-65, Wako Pure Chemicals Industries, Ltd.) as a polymerization initiator is added and polymerization is performed at 55° C. for 10 hours, whereby a reactive silicone polymer compound having an epoxy group is obtained. The weight average molecular weight of the reactive silicone polymer compound is 100,000. Then, the polymer compound is diluted with dimethylsilicone oil (KF-96L-1cs, manufactured by Shin-Etsu Silicone Corp.), whereby a silicone oil solution containing 3% by weight of the reactive silicone polymer compound is obtained.

Preparation of Display Medium

A display medium is prepared in the same manner as in Example A1, except that each treatment layer is formed by using the above silicone oil solution containing 3% by weight of the reactive silicone polymer compound. The treatment layer prepared from the reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example A1. Thereafter, the display medium is disassembled. The surfaces (surfaces that form the cells) of the display substrate and the spacing member are observed with an optical microscope. Although adhesion of particles is slightly observed, the adhesion is at a practically acceptable level.

Example A7

Preparation of Reactive Silicone Polymer Compound

As a reactive silicone polymer compound having an epoxy group, X-22-173DX (having a weight average molecular weight of 4,500) manufactured by Shin-Etsu Chemical Co., Ltd. is used. The polymer compound is diluted with dimethylsilicone oil (KF-96L-1cs, manufactured by Shin-Etsu Silicone Corp.), whereby a silicone oil solution containing 3% by weight of the reactive silicone polymer compound is obtained.

Preparation of Display Medium

A display medium is prepared in the same manner as in Example A1, except that each treatment layer is formed by using the above silicone oil solution containing 3% by weight of the reactive silicone polymer compound. The treatment layer prepared from the reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example A1. Thereafter, the display medium is disassembled. The surfaces (surfaces that form the cells) of the display substrate and the spacing member are observed with an optical microscope. Adhesion and fixing of particles to the surfaces is not observed.

Example A8

Preparation of Reactive Silicone Polymer Compound

SILAPLANE FM-0711 (having a weight average molecular weight Mw of 1,000; manufactured by CHISSO CORP) in an amount of 95 parts by weight as a silicone chain component (monomer) and KARENZ MOI (manufactured by SHOWA DENKO K. K.) in an amount of 5 parts by weight as a reactive component (monomer) are mixed with 100 parts by weight of dimethylsilicone oil (KF-96L-1cs, manufactured by Shin-Etsu Silicone Corp.). To the mixture, 0.5 part by weight of azobisvaleronitrile (V-65, Wako Pure Chemicals Industries, Ltd.) as a polymerization initiator is added and polymerization is performed at 55° C. for 10 hours, whereby a reactive silicone polymer compound having an epoxy group is obtained. The weight average molecular weight of the reactive silicone polymer compound is 100,000. Then, the polymer compound is diluted with dimethylsilicone oil (KF-96L-1cs, manufactured by Shin-Etsu Silicone Corp.), whereby a silicone oil solution containing 3% by weight of the reactive silicone polymer compound is obtained.

Preparation of Display Medium

A display medium is prepared in the same manner as in Example A1, except that each treatment layer is formed by using the above silicone oil solution containing 3% by weight of the reactive silicone polymer compound. The treatment layer prepared from the reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example A1. Thereafter, the display medium is disassembled. The surfaces (surfaces that form the cells) of the display substrate and the spacing member are observed with an optical microscope. Adhesion and fixing of particles to the surfaces is not observed.

Comparative Example A1

A display medium is prepared in the same manner as in Example A1, except that the treatment layers are not formed on the display substrate, the rear substrate, and the spacing member.

In this way, a display medium is prepared. Using the prepared display medium, magenta color and then white color are displayed, similarly to Example A1. Thereafter, the display medium is disassembled and the surfaces (surfaces that form the cells) of the display substrate and the spacing member are observed with an optical microscope. A large number of particles are found to be adhered and fixed thereto.

Example B

Example B1

Preparation of Non-Reactive Silicone Polymer Compound

SILAPLANE FM-0721 (having a weight average molecular weight Mw of 5,000, manufactured by CHISSO CORP) in an amount of 10 parts by weight as a silicone chain component (monomer) and 2-hydroxyethyl methacrylate in an amount of 20 parts by weight as a non-reactive component (monomer) are dissolved in 100 parts by weight of isopropyl alcohol. Then, 0.5 part by weight of 2,2'-azobis(2,4-dimethylvaleronitrile) (V-65, manufactured by Wako Pure Chemicals Industries, Ltd.) is added to the resultant solution, which is then agitated and allowed to react at 55° C. for 18 hours. Thereafter, isopropyl alcohol is removed from the solution, and then drying under reduced pressure is performed, thereby providing a non-reactive silicone polymer compound containing 33% by weight of the silicone chain component. The weight average molecular weight of the non-reactive silicone polymer compound is 250,000. The polymer compound is diluted with isopropyl alcohol, whereby an isopropyl alcohol solution containing 3% by weight of the non-reactive silicone polymer compound is obtained.

Preparation of Display Medium

A display medium having a configuration similar to that of the first exemplary embodiment is prepared as follows (see FIG. 1).

ITO serving as an electrode is deposited to a thickness of 50 nm on a 0.7 mm-thick glass substrate by sputtering. The electrode surface of the substrate (a rear substrate) composed of the ITO and the glass substrate is spin-coated with the isopropyl alcohol solution containing 3% by weight of the non-reactive silicone polymer compound, thereby forming a thin film. Then, the thin film is heated at 120° C. for 30 minutes to form a treatment layer. The treatment layer has a thickness of 200 nm and is insoluble in the following organic solvents: dimethylsilicone oil (KF-96L-1cs, manufactured by Shin-Etsu Silicone Corp.), acetone, tetrahydrofuran (THF), and isopropyl alcohol (IPA). The thickness of the treatment layer is measured with a step profiler DEKTAK 6M (manufactured by Veeco Instruments Inc.).

Then, a photosensitive polyimide varnish (PROBIMIDE 7005, manufactured by Fuji-Hunt Electronics Technology Co., Ltd.) is coated thereon to form a layer. By conducting exposure to light and wet etching, a spacing member having a height of 100 μm and a width of 20 μm is formed. A treatment layer is formed also on a surface (a surface at the cell interior side) of these spacing members in a manner similar to the formation of a treatment layer on the rear substrate.

A heat fusible adhesive layer (not shown in the figure) is formed on the upper portion of the spacing member, then the large-diameter colored particles (white particle group) and a dispersion liquid of the magenta particles are filled thereinto. A display substrate which is composed of ITO and a glass substrate, which is prepared in a manner similar to the preparation of the rear substrate, and which has a treatment layer thereon, is attached to the rear substrate such that the surfaces (electrode surfaces) of the substrates having the treatment layers thereon oppose each other, and then the resultant assembly is heated, whereby a display medium is obtained.

In this way, a display medium is prepared. Using the prepared display medium, a voltage of 50 V is applied between both electrodes such that the electrode of the display substrate becomes electrically positive while the electrode of the rear substrate becomes electrically negative. The negatively charged magenta particles are observed to move to the display substrate by an action of an electric field formed by the applied voltage, and the display medium displays magenta color.

Then, a voltage of 50 V is applied between the electrodes such that the electrode of the display substrate becomes electrically negative and the electrode of the rear substrate becomes electrically positive. The negatively charged magenta particles are observed to move to the rear substrate by an action of an electric field formed by the applied voltage, and the display medium displays white color.

Thereafter, the display medium is disassembled and the surfaces (the surfaces that form the cells) of the display substrate and the spacing member are observed with an optical microscope. Adhesion and fixing of particles to the surfaces is not observed.

Example B2

Preparation of Non-Reactive Silicone Polymer Compound

SILAPLANE FM-0721 (having a weight average molecular weight Mw of 5,000, manufactured by CHISSO CORP) in an amount of 0.3 parts by weight as a silicone chain component (monomer) and 2-hydroxyethyl methacrylate in an amount of 20 parts by weight as a non-reactive component (monomer) are dissolved in 100 parts by weight of isopropyl alcohol. Then, 0.5 part by weight of 2,2'-azobis(2,4-dimethylvaleronitrile) (V-65, manufactured by Wako Pure Chemicals Industries, Ltd.) is added to the resultant solution, which is then agitated and allowed to react at 55° C. for 18 hours. Thereafter, isopropyl alcohol is removed from the solution, and then drying under reduced pressure is performed, thereby providing a non-reactive silicone polymer compound containing 1.3% by weight of the silicone chain component. The weight average molecular weight of the non-reactive silicone polymer compound is 250,000. The polymer compound is diluted with isopropyl alcohol, whereby an isopropyl alcohol solution containing 3% by weight of the non-reactive silicone polymer compound is obtained.

Preparation of Display Medium

A display medium is prepared in the same manner as in Example B1, except that each treatment layer is formed by using the above isopropyl alcohol solution containing 3% by weight of the non-reactive silicone polymer compound. The treatment layer prepared from the non-reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example B1. Thereafter, the display medium is disassembled. The surfaces (surfaces that form the cells) of the display substrate and the spacing member are observed with an optical microscope. Adhesion and fixing of particles to the surfaces is not observed.

Example B3

Preparation of Non-Reactive Silicone Polymer Compound

SILAPLANE FM-0721 (manufactured by CHISSO CORP., having a weight average molecular weight Mw of 5,000) in an amount of 20 parts by weight as a silicone chain component (monomer) and 2-hydroxyethyl methacrylate in an amount of 1.5 parts by weight as a non-reactive component (monomer) are dissolved in 100 parts by weight of isopropyl alcohol. Then, 0.5 part by weight of 2,2'-azobis(2,4-dimethylvaleronitrile) (V-65, manufactured by Wako Pure Chemicals Industries, Ltd.) is added to the resultant solution, which is then agitated and allowed to react at 55° C. for 18 hours. Thereafter, isopropyl alcohol is removed from the solution, and then drying under a reduced pressure is performed, thereby providing a non-reactive silicone polymer compound containing 80% by weight of the silicone chain component. The weight average molecular weight of the non-reactive silicone polymer compound is 250,000. The polymer compound is diluted with isopropyl alcohol, whereby an isopropyl alcohol solution containing 3% by weight of the non-reactive silicone polymer compound is obtained.

Preparation of Display Medium

A display medium is prepared in the same manner as in Example B1, except that each treatment layer is formed by using the above isopropyl alcohol solution containing 3% by weight of the non-reactive silicone polymer compound. The treatment layer prepared from the non-reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example B1. Thereafter, the display medium is disassembled. The surfaces (surfaces that form the cells) of the display substrate and the spacing member are observed with an optical microscope. Adhesion and fixing of particles to the surfaces is not observed.

Example B4

Preparation of Non-Reactive Silicone Polymer Compound

SILAPLANE FM-0725 (having a weight average molecular weight Mw of 10,000, manufactured by CHISSO CORP) in an amount of 10 parts by weight as a silicone chain component (monomer) and 2-hydroxyethyl methacrylate in an amount of 20 parts by weight as a non-reactive component (monomer) are dissolved in 100 parts by weight of isopropyl alcohol. Then, 0.5 part by weight of 2,2'-azobis(2,4-dimethylvaleronitrile) (V-65, manufactured by Wako Pure Chemicals Industries, Ltd.) is added to the resultant solution, which is then agitated and allowed to react at 55° C. for 18 hours. Thereafter, isopropyl alcohol is removed from the solution, and then drying under reduced pressure is performed, thereby providing a non-reactive silicone polymer compound containing 33% by weight of the silicone chain component. The weight average molecular weight of the non-reactive silicone polymer compound is 250,000. The polymer compound is diluted with isopropyl alcohol, whereby an isopropyl alcohol solution containing 3% by weight of the non-reactive silicone polymer compound is obtained.

Preparation of Display Medium

A display medium is prepared in the same manner as in Example B1, except that each treatment layer is formed by using the above isopropyl alcohol solution containing 3% by weight of the non-reactive silicone polymer compound. The treatment layer prepared from the non-reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example B1. Thereafter, the display medium is disassembled. The surfaces (surfaces that form the cells) of the display substrate and the spacing member are observed with an optical microscope. Adhesion and fixing of particles to the surfaces is not observed.

Example B5

Preparation of Non-Reactive Silicone Polymer Compound

SILAPLANE FM-0711 (having a weight average molecular weight Mw of 1,000, manufactured by CHISSO CORP) in an amount of 10 parts by weight as a silicone chain component (monomer) and 2-hydroxyethyl methacrylate in an amount of 20 parts by weight as a non-reactive component (monomer) are dissolved in 100 parts by weight of isopropyl alcohol. Then, 0.5 part by weight of 2,2'-azobis(2,4-dimethylvaleronitrile) (V-65, manufactured by Wako Pure Chemicals Industries, Ltd.) is added to the resultant solution, which is then agitated and allowed to react at 55° C. for 18 hours. Thereafter, isopropyl alcohol is removed from the solution, and then drying under reduced pressure is performed, thereby providing a non-reactive silicone polymer compound containing 33% by weight of the silicone chain component. The weight average molecular weight of the non-reactive silicone polymer compound is 250,000. The polymer compound is diluted with isopropyl alcohol, whereby an isopropyl alcohol solution containing 3% by weight of the non-reactive silicone polymer compound is obtained.

Preparation of Display Medium

A display medium is prepared in the same manner as in Example B1, except that each treatment layer is formed by using the above isopropyl alcohol solution containing 3% by weight of the non-reactive silicone polymer compound. The treatment layer prepared from the non-reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (PA).

In this way, a display medium is prepared. Using the prepared display medium, magenta color and then white color are displayed, similarly to Example B1. Thereafter, the display medium is disassembled. The surfaces (surfaces that form the cells) of the display substrate and the spacing member are observed with an optical microscope. Adhesion and fixing of particles to the surfaces is not observed.

Example B6

Preparation of Non-Reactive Silicone Polymer Compound

A silicone chain component (monomer) of X-22-174DX (manufactured by Shin-Etsu Chemical Co., Ltd.) in an amount of 10 parts by weight and a non-reactive component (monomer) of 2-hydroxyethyl methacrylate in an amount of 20 parts by weight are dissolved in 100 parts by weight of isopropyl alcohol. Then, 0.5 part by weight of 2,2'-azobis(2, 4-dimethylvaleronitrile) (V-65, manufactured by Wako Pure Chemicals Industries, Ltd.) is added to the resultant solution, which is then agitated and allowed to react at 55° C. for 18 hours. Thereafter, isopropyl alcohol is removed from the solution, and then drying under reduced pressure is performed, thereby providing a non-reactive silicone polymer compound containing 33% by weight of the silicone chain component. The weight average molecular weight of the non-reactive silicone polymer compound is 200,000. The polymer compound is diluted with isopropyl alcohol, whereby an isopropyl alcohol solution containing 3% by weight of the non-reactive silicone polymer compound is obtained.

Preparation of Display Medium

A display medium is prepared in the same manner as in Example B1, except that each treatment layer is formed by using the above isopropyl alcohol solution containing 3% by weight of the non-reactive silicone polymer compound. The treatment layer prepared from the non-reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example B1. Thereafter, the display medium is disassembled. The surfaces (surfaces that form the cells) of the display substrate and the spacing member are observed with an optical microscope. Adhesion and fixing of particles to the surfaces is not observed.

Example B7

Preparation of Non-Reactive Silicone Polymer Compound

X-22-173DX (silicone chain component containing an epoxy group, manufactured by Shin-Etsu Chemical Co., Ltd.) in an amount of 10 parts by weight as a silicone chain component (monomer) and 2-hydroxyethyl methacrylate in an amount of 20 parts by weight as a non-reactive component (monomer) are dissolved in 100 parts by weight of isopropyl alcohol. Then, 0.5 part by weight of 2,2'-azobis(2,4-dimethylvaleronitrile) (V-65, manufactured by Wako Pure Chemicals Industries, Ltd.) is added to the resultant solution, which is then agitated and allowed to react at 55° C. for 18 hours. Thereafter, isopropyl alcohol is removed from the solution, and then drying under reduced pressure is performed, thereby providing a non-reactive silicone polymer compound containing 33% by weight of the silicone chain component. The weight average molecular weight of the non-reactive silicone polymer compound is 200,000. The polymer compound is diluted with isopropyl alcohol, whereby an isopropyl alcohol solution containing 3% by weight of the non-reactive silicone polymer compound is obtained.

Preparation of Display Medium

A display medium is prepared in the same manner as in Example B1, except that each treatment layer is formed by using the above isopropyl alcohol solution containing 3% by weight of the non-reactive silicone polymer compound. The treatment layer prepared from the non-reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example B1. Thereafter, the display medium is disassembled. The surfaces (surfaces that form the cells) of the display substrate and the spacing member are observed with an optical microscope. Adhesion and fixing of particles to the surfaces is not observed.

Example B8

Preparation of Non-Reactive Silicone Polymer Compound

SILAPLANE FM-0721 (having a weight average molecular weight Mw of 5,000, manufactured by CUSSO CORP) in an amount of 10 parts by weight as a silicone chain component (monomer) and N-vinyl-2-pyrrolidone in an amount of 20 parts by weight as a non-reactive component (monomer) are dissolved in 100 parts by weight of isopropyl alcohol. Then, 0.5 part by weight of 2,2'-azobis(2,4-dimethylvaleronitrile) (V-65, manufactured by Wako Pure Chemicals Industries, Ltd.) is added to the resultant solution, which is then agitated and allowed to react at 55° C. for 18 hours. Thereafter, isopropyl alcohol is removed from the solution, and then drying under reduced pressure is performed, thereby providing a non-reactive silicone polymer compound containing 33% by weight of the silicone chain component. The weight average molecular weight of the non-reactive silicone polymer compound is 250,000. The polymer compound is diluted with isopropyl alcohol, whereby an isopropyl alcohol solution containing 3% by weight of the non-reactive silicone polymer compound is obtained.

Preparation of Display Medium

A display medium is prepared in the same manner as in Example B1, except that each treatment layer is formed by using the above isopropyl alcohol solution containing 3% by weight of the non-reactive silicone polymer compound. The treatment layer prepared from the non-reactive silicone polymer compound is also insoluble in the following organic solvents: dimethylsilicone oil (KF-96L-1cs, manufactured by Shin-Etsu Silicone Corp.), acetone, tetrahydrofuran (THF), and isopropyl alcohol (IPA).

In this way, a display medium is prepared. Using the prepared display medium, magenta color and then white color are displayed, similarly to Example B1. Thereafter, the display medium is disassembled. The surfaces (surfaces that form the cells) of the display substrate and the spacing member are observed with an optical microscope. Adhesion and fixing of particles to the surfaces is not observed.

Comparative Example B1

Preparation of Non-Reactive Silicone Polymer Compound

SILAPLANE FM-0721 (having a weight average molecular weight Mw of 5,000, manufactured by CHISSO CORP) in an amount of 20 parts by weight as a silicone chain component (monomer) is dissolved in 100 parts by weight of isopropyl alcohol. Then, 0.04 part by weight of 2,2'-azobis(2,4-dimethylvaleronitrile) (V-65, manufactured by Wako Pure Chemicals Industries, Ltd.) is added to the resultant solution, which is then agitated and allowed to react at 55° C. for 18 hours. Thereafter, isopropyl alcohol is removed from the solution, and then drying under reduced pressure is performed, thereby providing a non-reactive silicone polymer compound containing 100% by weight of the silicone chain component. The weight average molecular weight of the non-reactive silicone polymer compound is 200,000. The polymer compound is diluted with isopropyl alcohol, whereby an isopropyl alcohol solution containing 3% by weight of the non-reactive silicone polymer compound is obtained.

Preparation of Display Medium

A display medium is prepared in the same manner as in Example B1, except that each treatment layer is formed by using the above isopropyl alcohol solution containing 3% by weight of the non-reactive silicone polymer compound.

In this way, a display medium is prepared. Using the prepared display medium, magenta color and then white color are displayed, similarly to Example B1. Thereafter, the display medium is disassembled. The surfaces (surfaces that form the cells) of the display substrate and the spacing member are observed with an optical microscope. Adhesion and fixing of particles to the surfaces is partially observed.

Comparative Example B2

A display medium is prepared in the same manner as in Example B1, except that the treatment layers are not formed on the display substrate, the rear substrate, and the spacing member.

In this way, a display medium is prepared. Using the prepared display medium, magenta color and then white color are displayed, similarly to Example B1. Thereafter, the display medium is disassembled. The surfaces (surfaces that form the cells) of the display substrate and the spacing member are observed with an optical microscope. A large number of particles are found to be adhered and fixed thereto.

Evaluation

Using each of the display media prepared in Examples A and B, an operation of displaying magenta color and white color is performed in a manner similar to Examples A1 and B1, (except Example A2 in which an operation of displaying cyan color and white color is performed). The display operation is conducted not only once, but conducted 100 times, and, further, 500 times. Thereafter, the display media are disassembled and the surfaces (surfaces that form the cells) of the display substrate and the spacing member are observed with an optical microscope. The evaluation criteria are as follows. The results are shown in Table 1.

A: No particles are found to be adhered and fixed
B: Although adhesion of particles is slightly observed, the adhesion is at a practically acceptable level.
C: A large number of particles are found to be adhered and fixed, and which is clearly recognizable even with naked eyes.

TABLE 1

Observation Results of Adhered and Fixed Particles

| | Numbers of display operation | | |
|---|---|---|---|
| | 1 time | 100 times | 500 times |
| Example A1 | A | A | A |
| Example A2 | A | A | A |
| Example A3 | A | A | A |
| Example A4 | A | A | A |
| Example A5 | A | A | A |
| Example A6 | B | B | B |
| Example A7 | A | A | A |
| Example A8 | A | A | A |
| Comparative Example A1 | C | C | C |
| Example B1 | A | A | B |
| Example B2 | B | B | B |
| Example B3 | A | A | A |
| Example B4 | A | A | A |
| Example B5 | A | A | B |
| Example B6 | A | A | A |
| Example B7 | A | A | A |
| Example B8 | A | A | A |
| Comparative Example B1 | C | C | C |
| Comparative Example B2 | C | C | C |

The above results indicate that adhesion and fixing of the particles is prevented in the Examples as compared with the Comparative Examples.

What is claimed is:

1. A display medium comprising:
a pair of substrates having electrodes and disposed to form a space therebetween, at least one of the substrates transmitting light;
a dispersion medium enclosed between the substrates;
a group of particles that is dispersed in the dispersion medium and that moves in the dispersion medium according to an electric field applied between the substrates; and
a treatment layer provided on at least one of surfaces of the substrates that oppose each other, the treatment layer comprising a polymer compound having a silicone chain as a side chain thereof.

2. The display medium according to claim 1, wherein the polymer compound having a silicone chain is a reactive silicone polymer compound.

3. The display medium according to claim 2, wherein the reactive silicone polymer compound is a copolymer of monomers including, at least, a monomer having a silicone chain and a monomer having a reactive group.

4. The display medium according to claim 3, wherein the copolymerization ratio of the monomer having a silicone chain is 50% by weight or more with respect to the weight of the copolymer.

5. The display medium according to claim 3, wherein the copolymerization ratio of the monomer having a silicone chain is 80% by weight or more with respect to the weight of the copolymer.

6. The display medium according to claim 3, wherein the copolymerization of the monomer having a reactive group is in the range of from 0.1% by weight to 10% by weight with respect to the weight of the copolymer.

7. The display medium according to claim 3, wherein the monomer having a reactive group is glycidyl(meth)acrylate having an epoxy group or an isocyanate monomer having an isocyanate group.

8. The display medium according to claim 2, wherein the treatment layer has a thickness of about 0.001 μm to 10 μm.

9. The display medium according to claim 1, wherein the polymer compound having a silicone chain is a non-reactive silicone polymer compound.

10. The display medium according to claim 9, wherein the non-reactive silicone polymer compound is a copolymer of monomers including at least a monomer having a silicone chain and a monomer having no reactive group.

11. The display medium according to claim 10, wherein the copolymerization ratio of the monomer having a silicone chain is from 0.01% to 95% by weight with respect to the weight of the copolymer.

12. The display medium according to claim 10, wherein the copolymerization ratio of the monomer having a silicone chain is from 0.1% to 80% by weight with respect to the weight of the copolymer.

13. The display medium according to claim 9, wherein the treatment layer has a thickness of about 0.01 μm to 10 μm.

14. The display medium according to claim 1, wherein the pair of substrates are a display substrate and a rear substrate, and the treatment layer is formed at least on a surface of the display substrate opposing the rear substrate.

15. The display medium according to claim 1, further comprising a spacing member partitioning the space between the substrates and having the treatment layer on a surface thereof.

16. The display medium according to claim 1, wherein the dispersion medium is silicone oil.

17. The display medium according to claim 1, further comprising, in the dispersion medium, another group of particles having a larger volume average particle diameter than the group of particles and having a different optical reflection properties from the group of particles.

18. A display device comprising:
the display medium according to claim 1; and
a voltage applying unit that applies a voltage between the substrates.

* * * * *